(12) United States Patent
Ohashi et al.

(10) Patent No.: US 11,755,861 B2
(45) Date of Patent: Sep. 12, 2023

(54) PRINTING SYSTEM AND PRINTING DETERMINATION METHOD

(71) Applicant: SEIKO EPSON CORPORATION, Tokyo (JP)

(72) Inventors: Kazuyoshi Ohashi, Matsumoto (JP); Shun Hara, Matsumoto (JP); Kenji Uchibori, Shiojiri (JP); Riku Maeda, Shiojiri (JP); Hirofumi Yanagisawa, Shiojiri (JP); Yu Tsumuraya, Ota-ku (JP); Kei Sadakuni, Kiyosu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/820,504

(22) Filed: Aug. 17, 2022

(65) Prior Publication Data

US 2023/0053483 A1 Feb. 23, 2023

(30) Foreign Application Priority Data

Aug. 19, 2021 (JP) ................. 2021-133902

(51) Int. Cl.
*G06F 15/00* (2006.01)
*G06K 15/02* (2006.01)
*G06K 15/10* (2006.01)
*G06F 3/12* (2006.01)

(52) U.S. Cl.
CPC ....... *G06K 15/1807* (2013.01); *G06F 3/1208* (2013.01); *G06F 3/1242* (2013.01); *G06K 15/102* (2013.01); *G06K 15/1831* (2013.01)

(58) Field of Classification Search
CPC ............. G06K 15/1807; G06K 15/102; G06K 15/1831; G06F 3/1208; G06F 3/1242

USPC ........................................................ 358/1.18
See application file for complete search history.

(56) References Cited

U.S. PATENT DOCUMENTS

| 2007/0057060 | A1* | 3/2007 | Hasuike | H04N 1/00379 235/454 |
| 2009/0141313 | A1* | 6/2009 | Chiken | H04N 1/32229 358/3.28 |
| 2019/0248168 | A1 | 8/2019 | Kubo et al. | |

FOREIGN PATENT DOCUMENTS

| JP | 2001-026176 A | 1/2001 |
| JP | 2019-136946 A | 8/2019 |

* cited by examiner

*Primary Examiner* — Mark R Milia
(74) *Attorney, Agent, or Firm* — WORKMAN NYDEGGER

(57) ABSTRACT

A printing system includes a printing unit, a position determiner that randomly determines a position where a first information code is to be set, a modifier that modifies print data for printing an image, the first information code, and a positional information code having recorded therein positional information at the time of printing that indicates the position determined by the position determiner so that the first information code is set at the position determined by the position determiner, an acquirer that acquires the position of the first information code on a print medium as positional information and acquires the positional information at the time of the printing from the positional information code, and a determiner that determines whether the printing result is a falsified matter based on comparison of the positional information after the printing with the positional information at the time of the printing.

20 Claims, 11 Drawing Sheets

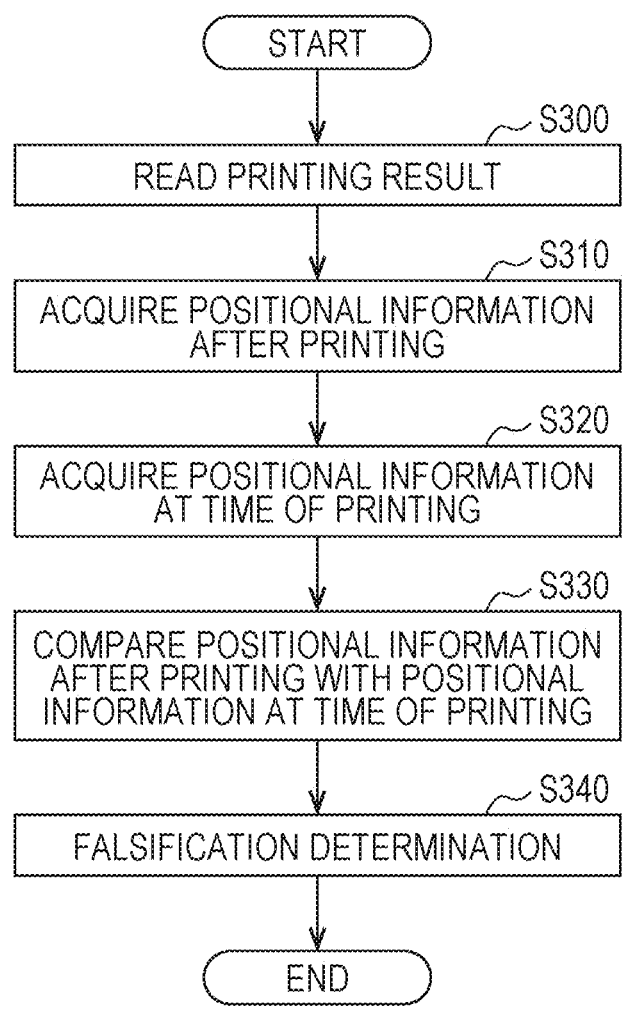

FIG. 7

| DIVIDED REGION | ENVIRONMENT A | ENVIRONMENT B | ENVIRONMENT C |
| --- | --- | --- | --- |
| FIRST REGION | TH1 | TH4 | TH7 |
| THIRD REGION | TH2 | TH5 | TH8 |
| FOURTH REGION | TH3 | TH6 | TH9 |

60

| DIVIDED REGION | ENVIRONMENT A | ENVIRONMENT B | ENVIRONMENT C |
| --- | --- | --- | --- |
| FIRST REGION | TH10 | TH13 | TH16 |
| THIRD REGION | TH11 | TH14 | TH17 |
| FOURTH REGION | TH12 | TH15 | TH18 |

61

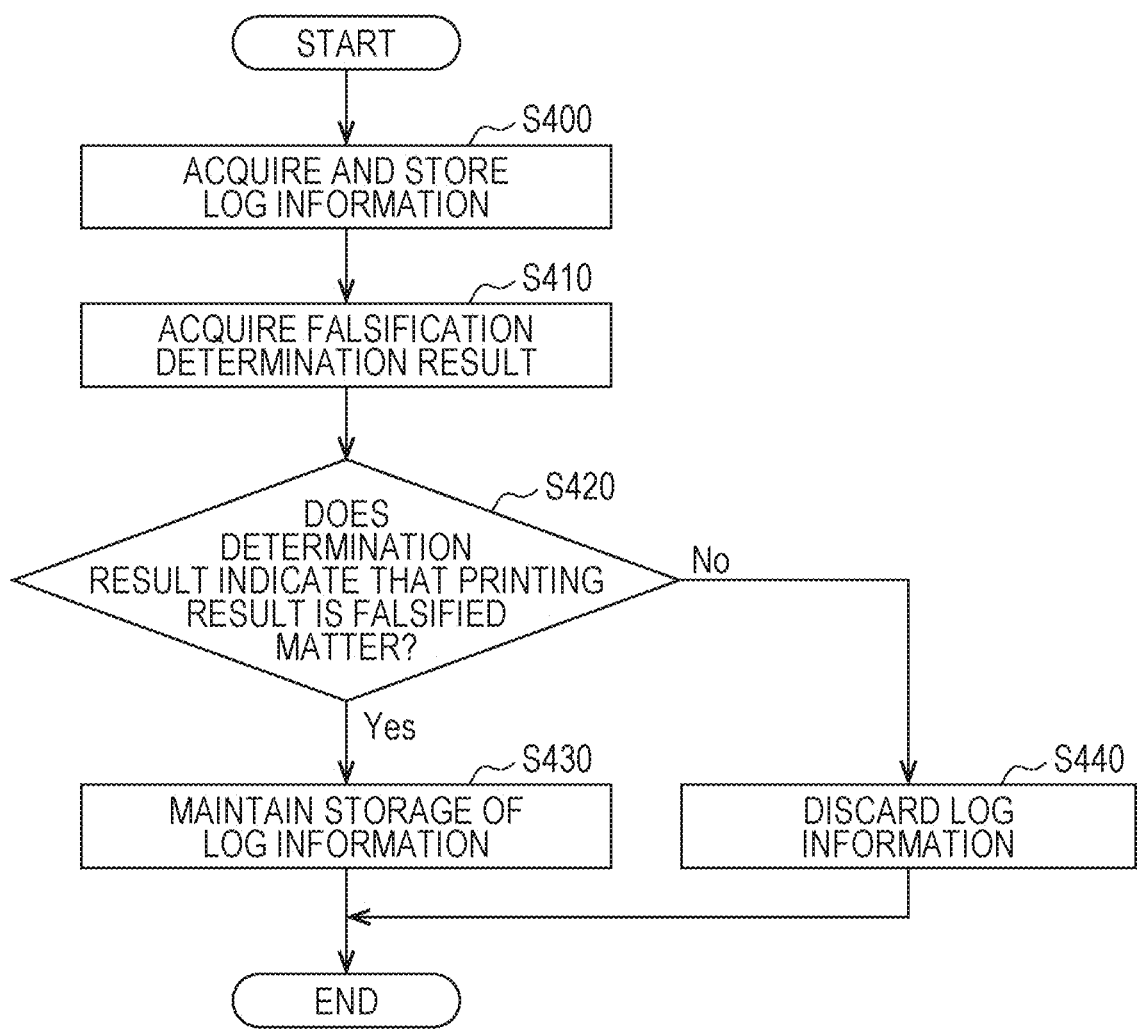

PRINTING SYSTEM AND PRINTING DETERMINATION METHOD

The present application is based on, and claims priority from JP Application Serial Number 2021-133902, filed Aug. 19, 2021, the disclosure of which is hereby incorporated by reference herein in its entirety.

BACKGROUND

1. Technical Field

The present disclosure relates to a printing system and a printing determination method.

2. Related Art

A printer may print an information code together with an image on a print medium. The information code is, for example, a barcode or a two-dimensional code.

As a related technique, a falsification determination method is disclosed, in which a two-dimensional code is printed on, for example, a lottery ticket, and special ink, which transmits visible light and reflects light with a predetermined wavelength when the special ink is irradiated with light having a specific wavelength not in the visible light range, is used to print a shape pattern that overlaps the two-dimensional code (see JP-A-2001-26176). According to this falsification determination method, when light with the specific wavelength is used to scan an overlapping portion of the two-dimensional code and the shape pattern, and light with the predetermined wavelength is not detected, it is determined that a print medium with the information code printed thereon has been falsified.

According to JP-A-2001-26176, since it is necessary to perform printing using the special ink and read the special ink using light with the specific wavelength, a printing device and a reading device that can be used are limited and the versatility is low. Therefore, a technique that can be used more universally for determining falsification and preventing falsification has been requested.

SUMMARY

According to an aspect of the present disclosure, a printing system includes a printing unit that performs printing on a print medium based on print data; a position determiner that randomly determines a position where a first information code is to be set in a printable region in which the print medium is printable by the printing unit; a modifier that modifies the print data for printing an image, the first information code, and a positional information code having recorded therein positional information at the time of the printing that indicates the position determined by the position determiner so that the first information code is set at the position determined by the position determiner; an acquirer that acquires the position of the first information code on the print medium as positional information after the printing via reading of a printing result of the printing performed by the printing unit on the print medium based on the print data and acquires the positional information at the time of the printing from the positional information code; and a determiner that determines whether the printing result is a falsified matter based on comparison of the positional information after the printing acquired by the acquirer with the positional information at the time of the printing acquired by the acquirer.

According to another aspect of the present disclosure, a printing system includes a printing unit that performs printing on a print medium based on print data; a position determiner that randomly determines a position where a first information code is to be set in a printable region in which the print medium is printable by the printing unit; a storage unit that stores positional information at the time of the printing that indicates the position determined by the position determiner; a modifier that modifies the print data for printing an image and the first information code so that the first information code is set at the position determined by the position determiner; an acquirer that acquires the position of the first information code on the print medium as positional information after the printing via reading of a printing result of the printing performed by the printing unit on the print medium based on the print data; and a determiner that determines whether the printing result is a falsified matter based on comparison of the positional information after the printing acquired by the acquirer with the positional information at the time of the printing acquired from the storage unit.

According to still another aspect of the present disclosure, a printing determination method includes a position determination step of randomly determining a position where a first information code is to be set in a printable region in which a print medium is printable by a printing unit; a modification step of modifying print data for printing an image, the first information code, and a positional information code having recorded therein positional information at the time of printing that indicates the position determined by the position determination step so that the first information code is set at the position determined by the position determination step; a printing step of performing the printing by the printing unit on the print medium based on the print data; an acquisition step of acquiring the position of the first information code on the print medium as positional information after the printing via reading of a printing result of the printing by the printing step and acquiring the positional information at the time of the printing from the positional information code; and a determination step of determining whether the printing result is a falsified matter based on comparison of the positional information after the printing acquired by the acquisition step with the positional information at the time of the printing acquired by the acquisition step.

According to still another aspect of the present disclosure, a printing determination method includes a position determination step of randomly determining a position where a first information code is to be set in a printable region in which a print medium is printable by a printing unit; a storing step of storing, in a storage unit, positional information at the time of printing that indicates the position determined by the position determination step; a modification step of modifying print data for printing an image and the first information code so that the first information code is set at the position determined by the position determination step; a printing step of performing the printing by the printing unit on the print medium based on the print data; an acquisition step of acquiring the position of the first information code on the print medium as positional information after the printing via reading of a printing result of the printing by the printing step; and a determination step of determining whether the printing result is a falsified matter based on comparison of the positional information after the printing acquired by the acquisition step with the positional information at the time of the printing acquired from the storage unit.

BRIEF DESCRIPTION OF THE DRAWINGS

FIG. 5 is a flowchart illustrating a falsification determination process.

FIG. 7 is a diagram illustrating an example of a threshold table.

FIG. 11 is a flowchart illustrating a log information management process according to a tenth embodiment.

DESCRIPTION OF EXEMPLARY EMBODIMENTS

Figure 1:
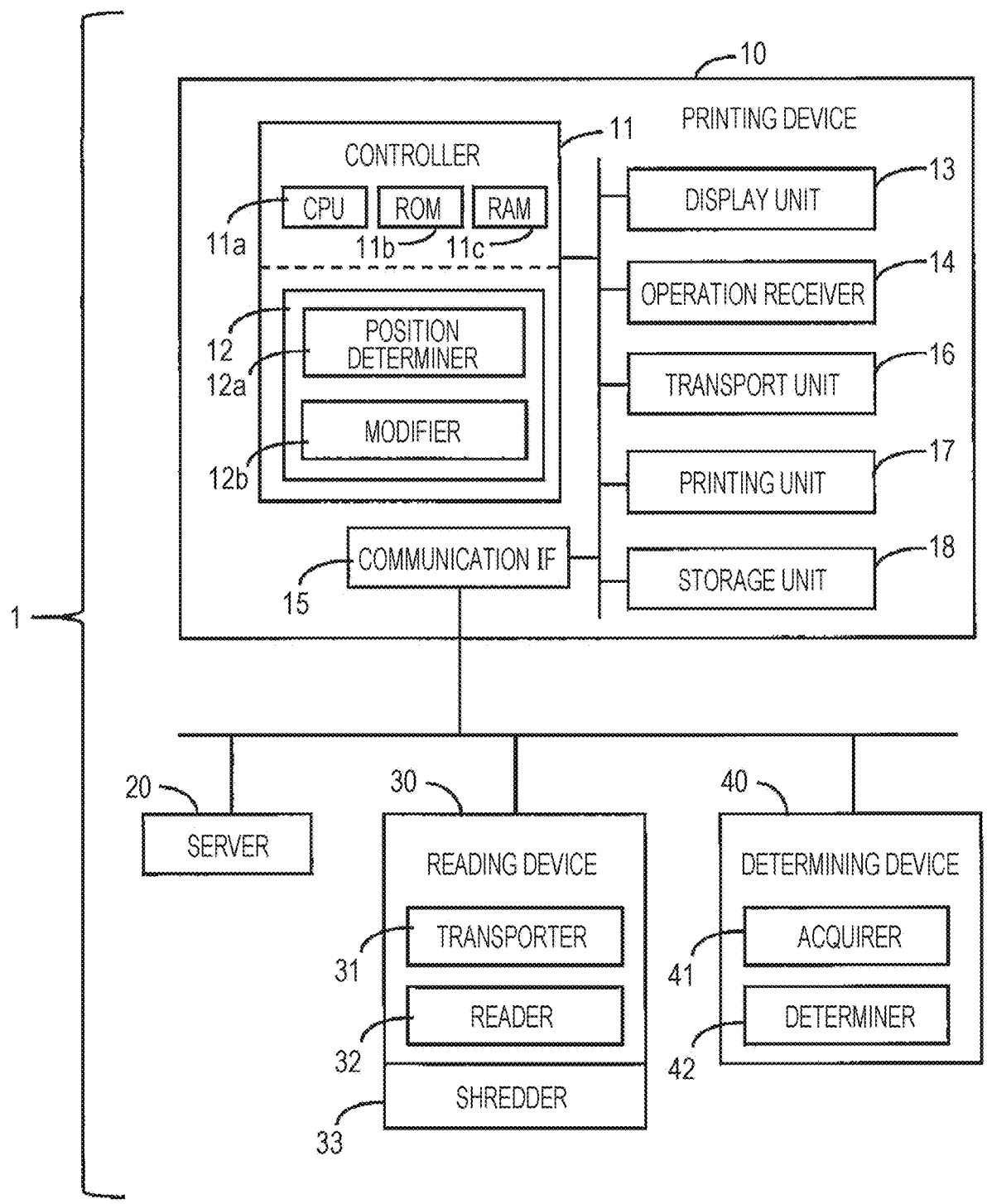
FIG. 1 is a block diagram simply illustrating a system configuration according to an embodiment.

Hereinafter, an embodiment of the present disclosure is described with reference to the drawings. Each of the drawings is merely an example for explaining the present embodiment. Since each of the drawings is an example, ratios and shapes may not be correct and may not be consistent with each other and some components may be omitted in the drawings.

1. Overview of System

FIG. 1 simply illustrates a configuration of a printing system 1 according to the present embodiment. The printing system 1 may be referred to as a falsification determination system or the like. A printing determination method is performed by the printing system 1. The printing system 1 includes a printing device 10, a server 20, a reading device 30, and a determining device 40.

The printing device 10 includes a controller 11, a display unit 13, an operation receiver 14, a communication IF 15, a transport unit 16, a printing unit 17, and a storage unit 18. IF is an abbreviation for interface. The controller 11 includes one or a plurality of ICs including a CPU 11a as a processor, a ROM 11b, and a RAM 11c, and a nonvolatile memory. In the controller 11, the processor, that is, the CPU 11a uses the RAM 11c or the like as a work area to execute arithmetic processing in accordance with a program 12 stored in the ROM 11b, another memory, or the like. The controller 11 implements a plurality of functions such as a position determiner 12a and a modifier 12b in accordance with the program 12. The processor is not limited to one CPU and may be configured to execute processing by a plurality of CPUs or a hardware circuit such as an ASIC or configured to execute the processing by causing the CPUs and the hardware circuit to collaborate with each other.

The display unit 13 is a section that displays visual information and is constituted by, for example, a liquid crystal display, an organic EL display, or the like. The display unit 13 may include a display and a drive circuit that drives the display. The operation receiver 14 is a section that receives an operation by a user. For example, the operation receiver 14 is implemented by, for example, a physical button, a touch panel, a mouse, a keyboard, or the like. The touch panel may be implemented as a function of the display unit 13. The display unit 13 and the operation receiver 14 may be correctively referred to as an operation panel of the printing device 10.

Each of the display unit 13 and the operation receiver 14 may be a part of the printing device 10, but may be a peripheral device externally attached to the printing device 10.

The communication IF 15 is a general term for one or a plurality of IFs for the printing device 10 to communicate with another device via a cable or wirelessly in accordance with a predetermined communication protocol including a known communication standard. In the example illustrated in FIG. 1, the controller 11 is connected to each of the server 20, the reading device 30, and the determining device 40 via the communication IF 15. The controller 11 can be connected to and communicate with various external devices not illustrated in FIG. 1 via the communication IF 15.

The transport unit 16 is a section that transports a print medium in a predetermined transport direction under control by the controller 11. For example, the transport unit 16 includes a roller that rotates to transport the print medium, a motor that drives the roller, and the like. The print medium is a paper sheet as a representative example. However, as long as data can be recorded on the print medium using liquid, the print medium may be a medium of a material other than paper.

The printing unit 17 is a mechanism that performs printing on the print medium by ejecting liquid such as ink by an ink jet method. The printing unit 17 may be referred to as a print head, a liquid ejection head, a printing head, a recording head, an ink jet head, or the like. The printing unit 17 includes a plurality of nozzles and ejects, under control by the controller 11, the liquid from the nozzles onto the print medium transported by the transport unit 16. Droplets ejected from the nozzles by the printing unit 17 are also referred to as dots. The printing unit 17 and the transport unit 16 may be collectively treated as a printing unit.

As is known, the printing device 10 controls, in accordance with print data, application of a drive signal to drive elements included in the nozzles so as to eject dots from the nozzles or not to eject dots from the nozzles. The drive elements are not illustrated in the drawings. The printing unit 17 can perform printing by ejecting ink of colors such as cyan (C), magenta (M), yellow (Y), and black (K), ink other than ink of these colors, or liquid other than ink, for example.

The storage unit 18 is a storage section that is, for example, a hard disk drive, a solid-state drive, or another memory. A part of a memory included in the controller 11 may be treated as the storage unit 18. The storage unit 18 may be treated as a part of the controller 11.

The server 20 is an information processing device that may function as a server shared by another device on a network. The server 20 also functions as a storage device.

The reading device 30 is a section that optically reads a document as a target to be read. The print medium after printing by the printing unit 17 is a type of document. The print medium after the printing by the printing unit 17 may be referred to as a printing result or a printed matter. The reading device 30 includes a transporter 31 that transports the document and a reader 32 that reads the document transported by the transporter 31. The reader 32 includes a light source that irradiates the document with light, an image sensor that reads light reflected from the document and light transmitted through the document, an image processing circuit that processes an electrical signal output by the image sensor as a result of the reading, and the like. The reading device 30 may be a sheet feed scanner.

The determining device 40 is an information processing device that functions as an acquirer 41 that acquires information necessary to determine whether the printing result is a falsified matter, and a determiner 42 that performs the determination.

Although not described in detail with reference to FIG. 1, each of the server 20, the reading device 30, and the determining device 40 includes hardware such as a processor and a memory and implements necessary processing by causing the hardware and a program to collaborate with each other.

A shredder 33 may be attached to the reading device 30. In the reading device 30, the document read by the reader 32 may be transported by the transporter 31 and inserted into the shredder 33. The shredder 33 shreds the inserted document into small pieces and discards the small pieces. The shredder 33 corresponds to a "discarding unit".

Not all the configurations illustrated in FIG. 1 may be required. For example, a configuration without the server 20 is also included in the present embodiment. In addition, the shredder 33 may not be provided, except for a tenth embodiment described later.

In the printing system 1, the printing device 10, the server 20, the reading device 30, and the determining device 40 may be devices independent of each other, or two or more of the printing device 10, the server 20, the reading device 30, and the determining device 40 may be integrated.

For example, the determining device 40 may be a part of any one of the printing device 10, the server 20, and the reading device 30. In addition, the printing device 10 and the reading device 30 may be integrated to form a multifunction device. In addition, the printing device 10, the reading device 30, and the determining device 40 may be integrated to form a device.

2. Printing of Information Code and Falsification Determination

Next, the printing determination method according to the present embodiment is described. The printing determination method includes printing of an information code and falsification determination.

First Embodiment

Figure 2:
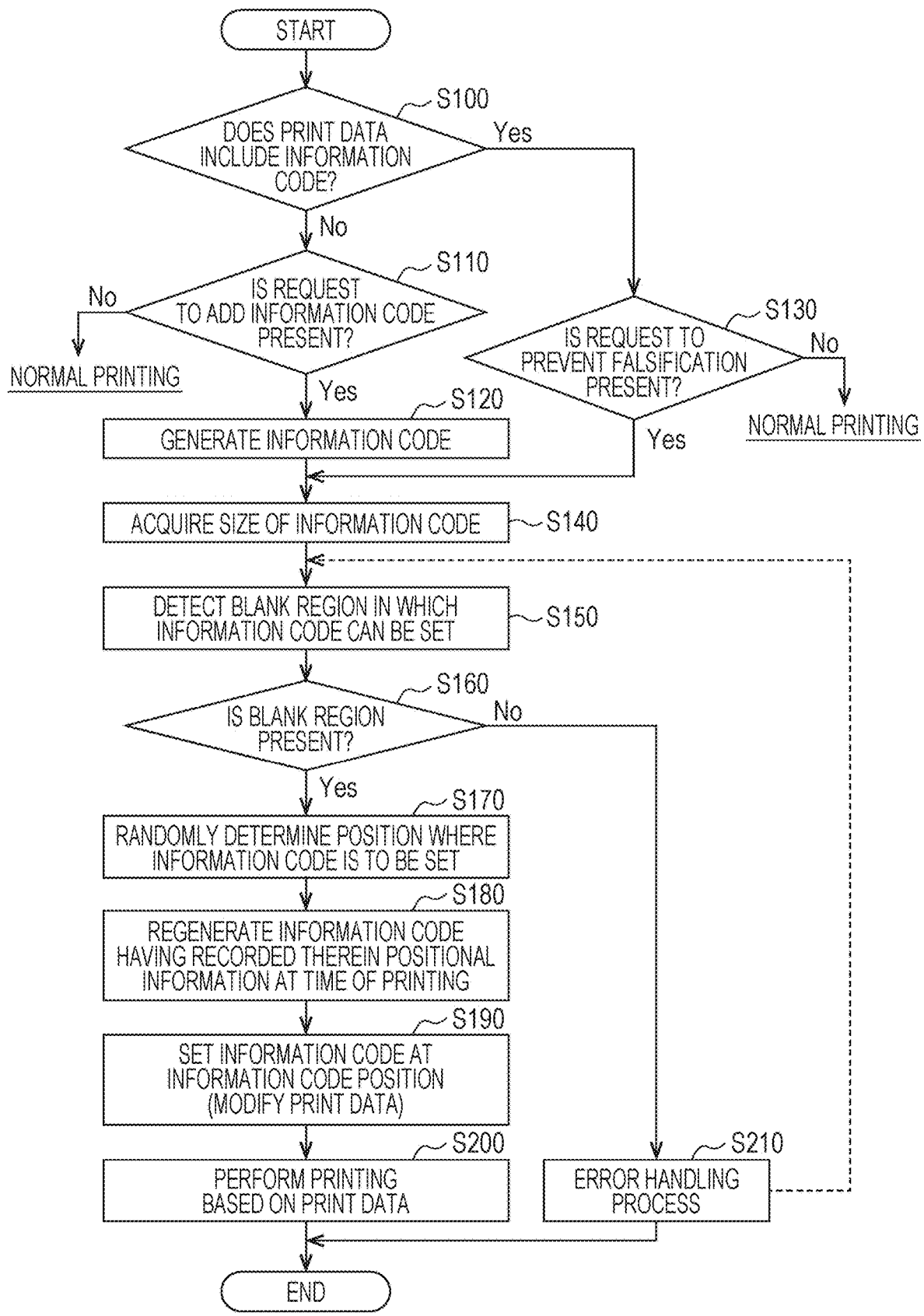
FIG. 2 is a flowchart illustrating an information code printing process according to a first embodiment.

FIG. 2 is a flowchart illustrating an information code printing process according to a first embodiment. The controller 11 of the printing device 10 starts the flowchart illustrated in FIG. 2 in response to receiving a print command. The print command is, for example, information including information specifying an image (hereinafter referred to as a target image) to be printed and various print settings necessary for the printing. The print command is input to the printing device 10 by the user operating the operation receiver 14. Alternatively, the print command is input to the printing device 10 from an external device via the communication IF 15.

In step S100, the controller 11 acquires print data for printing the target image and determines whether the print data includes an information code. The print data for printing the target image is image data representing the target image in a predetermined file format. The target image is, for example, a picture, an illustration, a text, computer graphics, or the like, but the content of the target image is arbitrary in this case. The target image may be a lottery ticket or the like as described in JP-A-2001-26176. The print data is attached to the print command. Alternatively, the controller 11 acquires the print data from a memory or the like that stores the print data specified in the print command.

When the print data includes not only the target image but also the information code that is a two-dimensional code, a barcode, or the like, the controller 11 determines "Yes" in step S100 and causes the process to proceed to step S130. On the other hand, when the print data does not include the information code, the controller 11 determines "No" in step S100 and causes the process to proceed to step S110. In the present embodiment, the "information code" means a "first information code". The "first" of the first information code is merely a description for convenience to distinguish from a "positional information code" described later. The positional information code may be referred to as a second information code.

The content of information recorded in the information code is not particularly limited, but it may be understood that the information code has recorded therein information relating to the print data. The information relating to the print data is, for example, information indicating whether the content of the target image is confidential information, information indicating how to handle the target image, a person who created the print data, a person who holds the right to the print data, a date and time when the print data was created, the purpose of use of the print data, the name of a user who prints the print data, a date and time when the print data is printed, a location where the print data is printed, and the like.

In step S110, the controller 11 determines whether a request to add the information code is present. The request to add the information code is an instruction to print the information code together with the target image and may be included in the print command or instructed in the print settings. When the request to add the information code is present, the controller 11 determines "Yes" in step S110 and causes the process to proceed to step S120. On the other hand, when the request to add the information code is not present, the controller 11 determines "No" in step S110 and causes the process to proceed to normal printing.

The normal printing is a general process of printing the target image on the print medium based on the print data and thus will not be described.

In step S120, the controller 11 generates the information code according to the request to add the information code. The controller 11 generates the information code by analyzing the print command and the print data and receiving information from the user as necessary.

In step S130, the controller 11 determines whether a request to prevent falsification is present. The request to prevent falsification is an instruction to perform a process of preventing a result of printing the target image from being falsified according to the present embodiment and may be included in the print command or instructed in the print settings. The above-described request to add the information code also serves as the request to prevent falsification. When the request to prevent falsification is present, the controller 11 determines "Yes" in step S130 and causes the process to proceed to step S140. On the other hand, when the request to prevent falsification is not present, the controller 11 determines "No" in step S130 and causes the process to proceed to the normal printing. The normal printing to which the process proceeds when the controller 11 determines "No" in step S130 is a process of printing the target image and the information code as represented by the current print data on the print medium based on the print data, and thus will not be described.

The print data for printing the target image may include the information code when the controller 11 acquires the print data. Alternatively, the print data for printing the target image may not include the information code when the controller 11 acquires the print data, and the controller 11 may generate the information code to be printed together with the target image.

After step S120 or after step S130, in step S140, the position determiner 12a of the controller 11 acquires the size of the information code. The position determiner 12a may measure vertical and horizontal sizes of the information code. Alternatively, the position determiner 12a may acquire the vertical and horizontal sizes of the information code via an operation of the operation receiver 14 by the user.

In step S150, the position determiner 12a detects a blank region in which the information code can be set and that is included in a "printable region" in which the print medium is printable by the printing unit 17. The position determiner 12a can recognize the size of the printable region from the size of the print medium specified in the print settings and width values of borders specified in the print settings and to be secured along four sides of the print medium. When so-called borderless printing is set, that is, when the width values of the borders=0, the size of the print medium is the size of the printable region.

The blank region is a region included in the printable region and excluding the target image. Therefore, the position determiner 12a tries to detect a region of a size equal to or larger than the size of the information code from the blank region recognized when the target image is set in the printable region.

When the position determiner 12a successfully detects the blank region in which the information code can be set as a result of step S150, the position determiner 12a determines "Yes" in step S160 and causes the process to proceed to step S170. On the other hand, when the position determiner 12a fails to detect the blank region in which the information code can be set as a result of step S150, the position determiner 12a determines "No" in step S160 and causes the process to proceed to step S210.

Figure 3A:
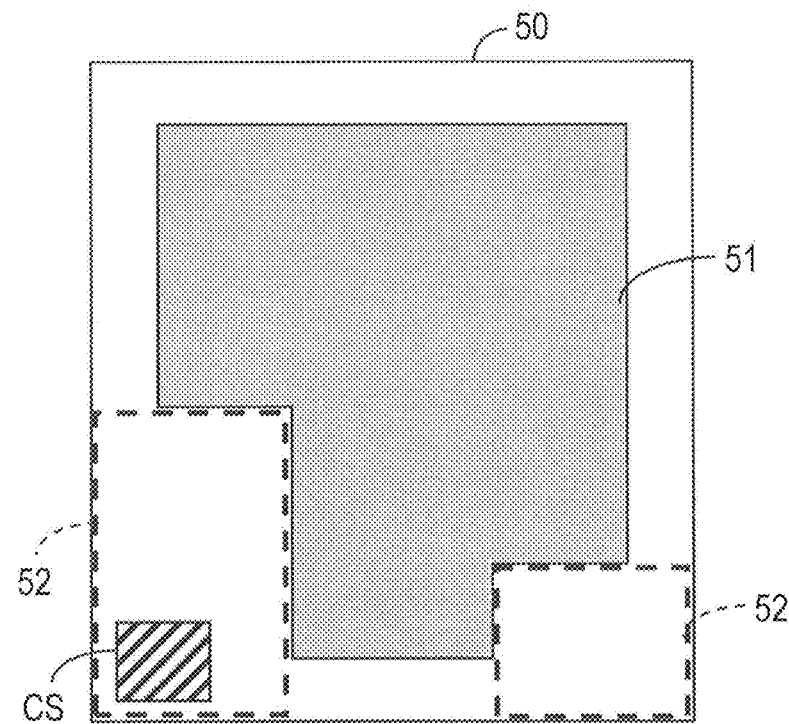
FIG. 3A is a diagram describing a process of detecting a blank region in which an information code can be set according to the first embodiment.

FIG. 3A is a diagram describing the blank region in which the information code can be set in the first embodiment. A rectangle indicated by reference sign 50 is a printable region 50 recognized by the position determiner 12a. In FIG. 3A, a range illustrated in gray for convenience corresponds to a target image 51, and a region included in the printable region 50 and excluding the target image 51 is a blank region. In addition, a hatched rectangle indicates the size (code size CS) of the information code acquired in step S140. In the example illustrated in FIG. 3A, in step S150, the position determiner 12a detects, as a blank region (hereinafter referred to as a specific blank region 52) in which the information code can be set, a region 52 that can include the code size CS from the blank region. In FIG. 3A, two specific blank regions 52 are surrounded by broken lines and illustrated in an understandable manner.

In step S170, the position determiner 12a randomly determines a position (hereinafter referred to as an information code position) where the information code is to be set in the blank region in which the information code can be set. Since the position is randomly determined, it suffices for any position in the target region to be determined as the information code position without particularly following regularity. Referring to the example illustrated in FIG. 3A, the position determiner 12a determines, as the information code position, a position that is in one of the specific blank regions 52 and at which the code size CS does not extend beyond the specific blank region 52. For example, the position determiner 12a can assign numbers to all positions where the code size CS can be set in the specific blank regions 52 for convenience, and can set a position corresponding to a number obtained by generating a random number to the information code position. Step S170 and the process leading to step S170, for example, steps S140 to S170 correspond to a "position determination step" of randomly determining a position where a first information code is to be set.

Information indicating the information code position determined in step S170 is hereinafter referred to as "positional information at the time of the printing". The positional information at the time of the printing is, for example, positional information indicating a distance from a side of the print medium to the information code. The controller 11 recognizes the size of the print medium. Therefore, for example, the positional information at the time of the printing is defined by a distance from a left side extending in a vertical direction among four sides of the print medium to the information code position in a horizontal direction and a distance from an upper side extending in the horizontal direction among the four sides of the print medium to the information code position in the vertical direction.

Alternatively, the positional information at the time of the printing may be positional information indicating a distance from a reference image RM to be printed in the printable region 50 to the information code position. For the reference image RM, refer to FIG. 4A and the like. The reference image RM is an image different from the target image 51 and the information code. The reference image RM is printed together with the target image 51 and the information code on the print medium based on the print data. The controller 11 recognizes a predetermined position of the reference image RM in advance. Therefore, the positional information at the time of the printing may be defined by a distance from the reference image RM to the information code position in the horizontal direction and a distance from the reference image RM to the information code position in the vertical direction.

In step S180, the modifier 12b of the controller 11 regenerates the information code having recorded therein the positional information at the time of the printing. That is, the information code to be printed together with the target image is regenerated by updating the information code obtained at the current time so that the information code includes the positional information at the time of the printing. The information code regenerated in this manner may serve as a "positional information code" having recorded therein the positional information at the time of the printing. That is, in the first embodiment, the modifier 12b generates a part of the information code as the positional information code.

In step S190, the modifier 12*b* updates the print data by setting the information code regenerated in step S180 at the information code position. This update may be a modification of the print data including the information code when the controller 11 acquires the print data, or may be a modification of the print data not including the information code when the controller acquires the print data. Steps S180 and S190 correspond to a "modification step" of modifying print data for printing an image (target image), the first information code, and a positional information code having recorded therein positional information at the time of printing so that the first information code is set at the position determined by the position information step.

When the positional information at the time of the printing is defined by the distance from the reference image RM, it is also necessary to set the reference image RM in the print data. Therefore, in step S190, the modifier 12*b* modifies the print data so that the reference image RM is set at a predetermined position in the printable region 50 together with the modification described above. When the positional information at the time of the printing is defined by the distance from the side of the print medium, the reference image RM is not necessary.

Figure 4A:
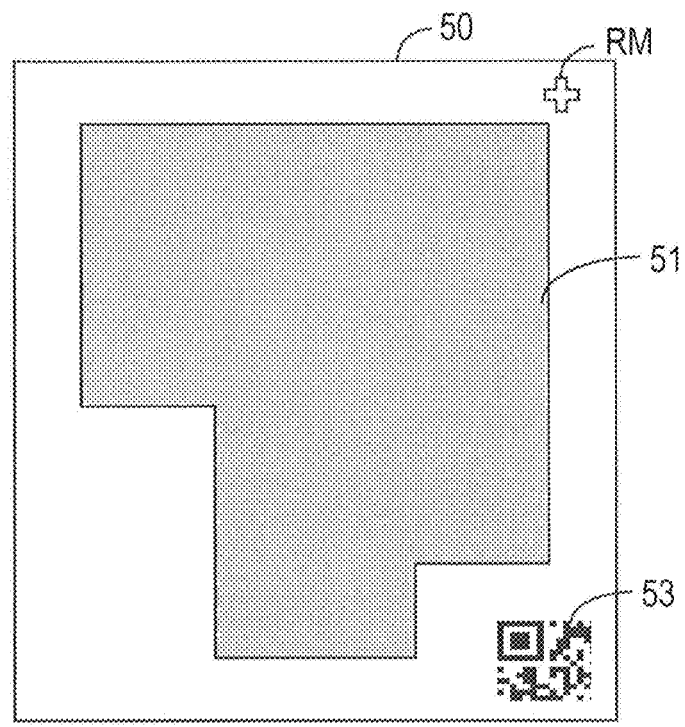
FIG. 4A is a diagram illustrating a relationship between a printable region, and a target image and an information code that are represented by print data after modification according to the first embodiment.

FIG. 4A illustrates a relationship between the printable region 50, and the target image 51 and the like represented by the print data after the modification in step S190. According to FIG. 4A, in the printable region 50, the target image 51, the information code 53, and the reference image RM are set. A position where the information code 53 is set is the information code position determined in step S170.

In step S200, the controller 11 controls the transport unit 16 and the printing unit 17 and causes the printing unit 17 to perform printing based on the print data after the modification. Before the controller 11 transfers the print data to the printing unit 17, the controller 11 converts the print data into data in a format enabling the printing data 17 to print the print data, specifically, data specifying ejection (dot-on) or non-ejection (dot-off) of a dot for each pixel and for each ink color. Thereafter, the controller 11 transfers the print data to the printing unit 17. Step S200 corresponds to a "printing step" of performing printing by the printing unit 17 on the print medium based on the print data. As a result, when the target image 51, the information code 53, and the reference image RM are included in the print data, the target image 51, the information code 53, and the reference image RM are printed in the printable region of the single print medium. Then, the information code printing process ends.

In step S210, since an appropriate blank region in which the information code is to be set is not present in the printable region, the controller 11 performs an error handling process and ends the flowchart of the information code printing process. In the error handling process, since an appropriate space for printing the information code is not present, the controller 11 notifies the user that printing cannot be performed. The controller 11 may cause the display unit 13 to display this notification or may transmit the notification to an external PC, a smartphone, and the like via the communication IF 15 and cause displays of these external devices to display the notification. As the notification, an audio announcement may be used.

The method of determining the information code position by the position determiner 12*a* is described more below. Since the information code position is randomly determined, even when the target image represented by the same print data is to be printed on a plurality of print media, information code positions basically differ for each of the print media. That is, when the information code positions are randomly determined, the information code positions may happen to match each other. The information code positions on the print media when the same target image is printed on the plurality of print media are different from each other in many cases. According to this, when the same target image is to be printed on a plurality of print media by the printing unit 17, the position determiner 12*a* may determine positions of the information code that correspond to the plurality of print media such that the position of the information code on at least one of the print media is different from the position of the information code on the other print medium or media.

FIG. 5 is a flowchart illustrating a falsification determination process.

In step S300, the reader 32 reads the print medium after the printing by the printing unit 17, that is, reads the printing result. In this case, the transporter 31 of the reading device 30 transports the print medium. When the user sets the print medium after the printing by the printing unit 17 at the reading device 30 and causes the reading device 30 to start reading the print medium, step S300 is performed. As a result of step S300, read image data as a result of reading the print medium after the printing is generated by the reader 32. In addition, the reading device 30 provides the read image data to the determining device 40.

In step S310, the acquirer 41 acquires, from the read image data, the position of the information code on the print medium as "positional information after the printing". As described above, the positional information at the time of the printing indicates the distance from the side of the print medium to the information code position. The acquirer 41 detects the information code 53 by analyzing the read image data. Then, the acquirer 41 calculates, based on the read image data, a distance from the left side of the print medium to the information code 53 in the horizontal direction and a distance from the upper side of the print medium to the information code 53 in the vertical direction and acquires the results of the calculation as the positional information after the printing.

Alternatively, the positional information at the time of the printing indicates the distance from the reference image RM to the information code position. Based on such a premise, the acquirer 41 also detects the reference image RM by analyzing the read image data. Then, the acquirer 41 may calculate, based on the read image data, a distance from the reference image RM to the information code 53 in the horizontal direction and a distance from the reference image RM to the information code 53 in the vertical direction and acquire the results of the calculation as the positional information after the printing.

In step S320, the acquirer 41 acquires, from the information code 53, the "positional information at the time of the printing" detected from the read image data. Since the information code 53 also serves as the positional information code, the acquirer 41 decodes the information code 53 to acquire the positional information at the time of the printing that has been recorded in the information code 53. Steps S310 and S320 correspond to an "acquisition step" of acquiring the position of the first information code on the print medium as positional information after the printing via reading of a printing result of the printing by the printing step and acquiring the positional information at the time of the printing from the positional information code.

In step S330, the determiner 42 compares the positional information after the printing acquired in step S310 with the positional information at the time of the printing acquired in step S320.

In step S340, the determiner 42 determines, based on the comparison in step S330, whether the printing result is a falsified matter. That is, when the positional information after the printing matches the positional information at the time of the printing, the determiner 42 determines that the read printing result is not the falsified matter. When the positional information after the printing does not match the positional information at the time of the printing, the determiner 42 determines that the read printing result is the falsified matter. Thereafter, the falsification determination process ends. Steps S330 and S340 correspond to a "determination step" of determining whether the printing result is a falsified matter based on comparison of the acquired positional information after the printing with the acquired positional information at the time of the printing.

The positional information after the printing is a value calculated by analyzing the read image data of the printing result. Even when the valid printed matter on which the target image 51 and the information code 53 has been printed is read, the positional information after the printing may not exactly match the positional information at the time of the printing. Therefore, the determiner 42 may make the determination using a predetermined margin for the degree of match between the positional information after the printing and the positional information at the time of the printing. That is, when the difference between the positional information after the printing and the positional information at the time of the printing is within the predetermined margin, the determiner 42 may determine that the positional information after the printing matches the positional information at the time of the printing.

When the acquirer 41 cannot detect the information code 53 from the read image data and cannot acquire the positional information after the printing in step S310 or cannot acquire, from the information code 53, the positional information at the time of the printing detected from the read image data in step S320, the comparison in step S330 is not possible. When the comparison in step S330 is not possible due to the reason described above or the like, the determiner 42 determines that the read printing result is the falsified matter in step S340.

Methods of handling and using the determination result obtained by performing the falsification determination process are not particularly limited. The determiner 42 may cause the display unit 13 to display the determination result obtained in step S340 and may transmit the determination result to an external PC, a smartphone, and the like to notify the user of the determination result, for example. In addition, the determiner 42 may associate the determination result obtained in step S340 with the read image data of the printing result and store the determination result to predetermined memories or storage units of the determining device 40, the printing device 10, the server 20, and the reading device 30. In addition, the reading device 30 and the determining device 40 can decode and acquire information recorded in the information code 53 in the read image data and excluding the positional information at the time of the printing, that is, information originally included in the information code, and can use and process the information acquired in this manner and included in the information code 53 according to predetermined methods of handling and using the information.

Second to tenth embodiments are described below. Parts different from the first embodiment are basically described in the second to tenth embodiments, and parts common to the first embodiment will not be described. In addition, contents obtained by combining two or more of the embodiments belong to the present disclosure in the present specification.

3. Second Embodiment

Figure 6:
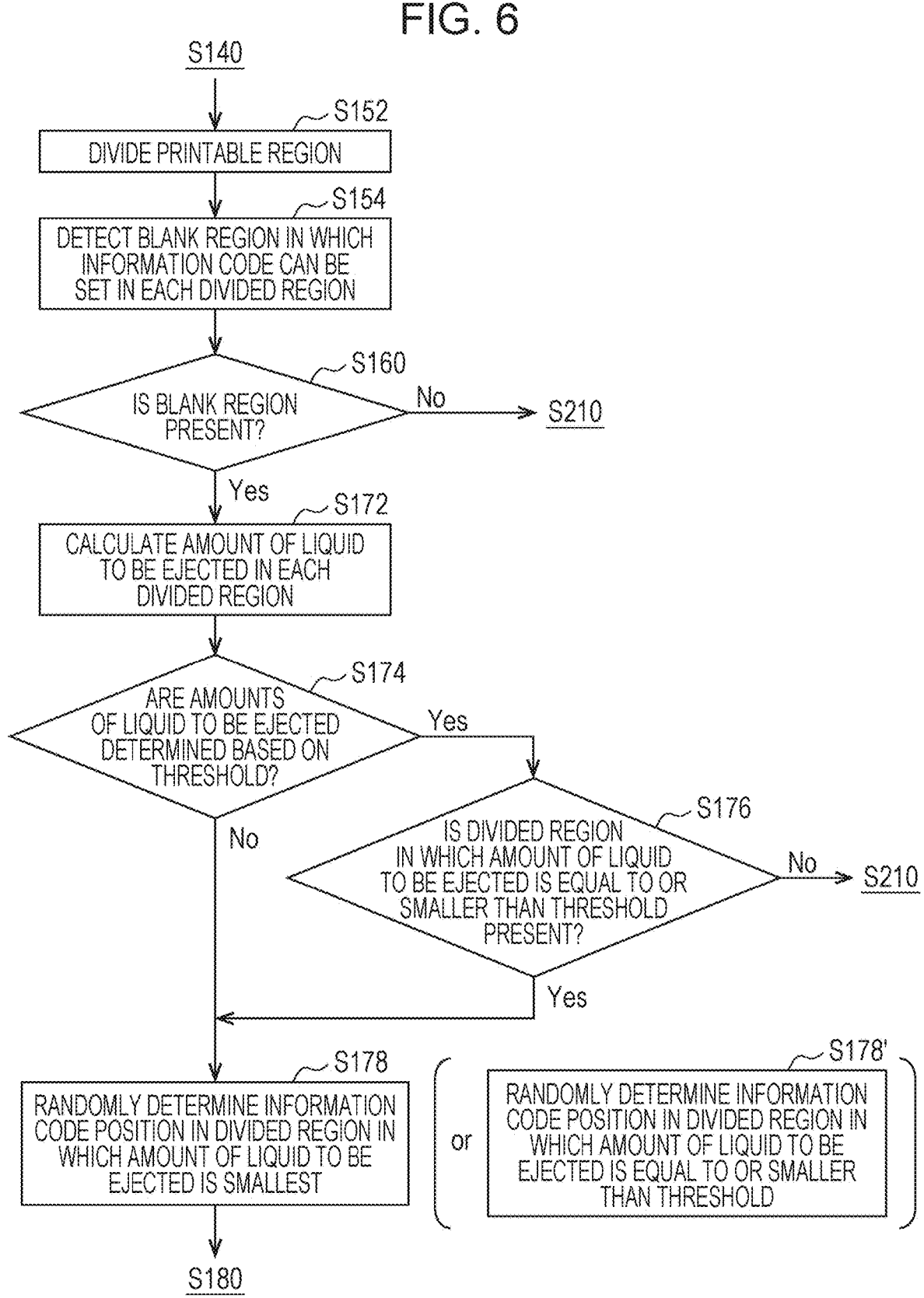
FIG. 6 is a flowchart illustrating a part of an information code printing process according to the second embodiment.

FIG. 6 is a flowchart illustrating a part of an information code printing process according to the second embodiment. In the second embodiment, steps S150 to S170 of FIG. 2 are replaced with the flowchart of FIG. 6. A part of the print medium onto which a large amount of liquid has been ejected easily curls. The curling indicates curving or undulating. When a part of the print medium on which the information code has been printed curls, it may be difficult to read the information code and the accuracy of reading the information code may decrease. To avoid such a situation, in the second embodiment, the position determiner 12a determines the information code position by selecting a region in which the amount of the liquid to be ejected to the print medium is relatively small.

Figure 3B:
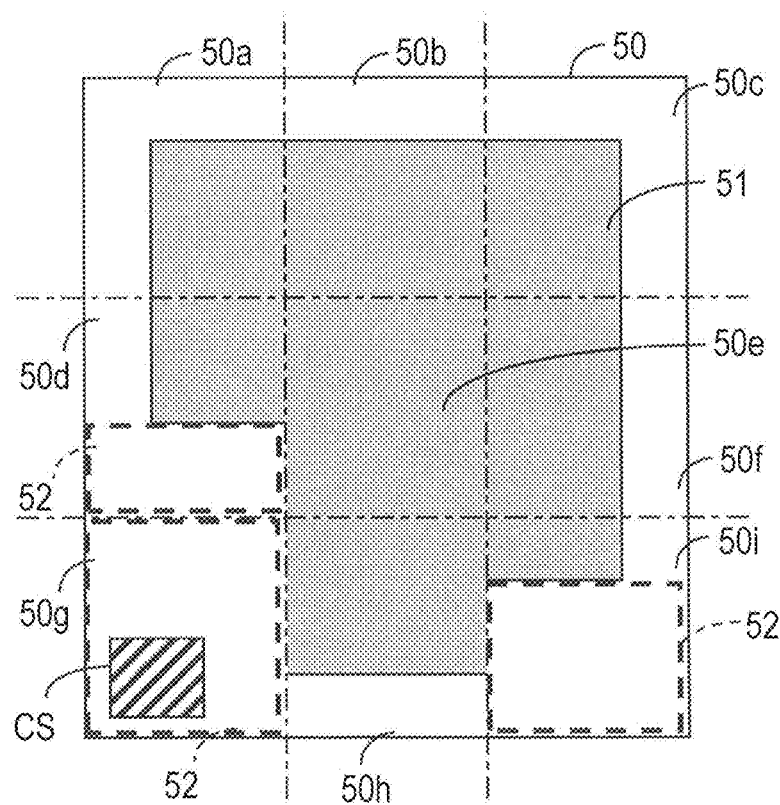
FIG. 3B is a diagram describing a process of detecting a blank region in which an information code can be set according to a second embodiment.

After step S140, in step S152, the position determiner 12a divides the printable region 50 into a plurality of regions. Each of the regions divided in step S152 is referred to as a "divided region". FIG. 3B is a diagram describing a process of detecting a blank region in which the information code can be set in the second embodiment. The view of FIG. 3B is the same as that of FIG. 3A. In an example illustrated in FIG. 3B, the printable region 50 is divided into 9 divided regions 50a, 50b, 50c, 50d, 50e, 50f, 50g, 50h, and 50i by dashed-and-dotted lines in vertical and horizontal directions. The number of divided regions is not limited to 9.

In step S154, the position determiner 12a detects, for each of the divided regions, a blank region in which the information code can be set. In FIG. 3B, for example, the blank region in the divided region 50a does not include a space in which the code size CS can be set. On the other hand, the blank region in the divided region 50d includes a space in which the code size CS can be set. In the example illustrated in FIG. 3B, the position determiner 12a detects, as a blank region in which the information code can be set, a specific blank region 52 in which the code size CS can be set, from each of the divided regions 50d, 50g, and 50i.

When the position determiner 12a successfully detects a blank region in which the information code can be set from one or more of the divided regions as a result of step S154, the position determiner 12a determines "Yes" in step S160 and causes the process to proceed to step S172. On the other hand, when the position determiner 12a does not successfully detects a blank region in which the information code can be set from all the divided regions as a result of step S154, the position determiner 12a determines "No" in step S160 and causes the process to proceed to step S210.

In step S172, the position determiner 12a calculates, for each of the divided regions, the "amount of the liquid to be ejected" by the printing unit 17 for printing a target image. The amount of the liquid to be ejected may be referred to as a duty, a printing rate, coverage, a recording rate, or the like. As described above, print data is image data representing the target image. The print data includes, for example, a gradation value for each of the colors C, M, Y, and K for each of pixels constituting the target image 51. Each of the gradation values is represented by 256 gradation levels of 0 to 255 and indicates the amount of ink. The position determiner 12a treats the sum of the gradation values of the colors C, M, Y, and K of all the pixels constituting the target image 51 in one divided region as the amount of the liquid to be ejected in the divided region. Alternatively, the position determiner 12a may convert each of the gradation values of the colors C, M, Y, and K of each of the pixels constituting the target image 51 in the one divided region to dot-on or dot-off by halftone processing and may treat the number (number of dots) of gradation values converted to dot-on as the amount of the liquid to be ejected in the divided region. Alternatively, the ratio of the number of dots to the number of pixels of the divided region may be referred to as the amount of the liquid to be ejected in the divided region.

The position determiner 12*a* may calculate an amount of the liquid to be ejected in a divided region from which the position determiner 12*a* has detected a blank region in which the information code can be set in step S154. In the example illustrated in FIG. 3B, since the specific blank regions 52 are detected from the divided regions 50*d*, 50*g*, and 50*i*, the position determiner 12*a* may calculate the amount of the liquid to be ejected in each of the divided regions 50*d*, 50*g*, and 50*i*. Since the target image 51 is not present in the divided region 50*g*, the amount of the liquid to be ejected in the divided region 50*g* is 0. On the other hand, since a part of the target image 51 is included in each of the divided regions 50*d* and 50*i*, the amount of the liquid to be ejected that is calculated for each of the divided regions 50*d* and 50*i* is not zero.

In step S174, the position determiner 12*a* determines whether to use a threshold to make a determination about the amounts of the liquid to be ejected that have been calculated in step S172. The determination using the threshold for the amounts of the liquid to be ejected may be a determination of whether the amounts of the liquid to be ejected cause the print medium to curl. When information indicating that the determination using the threshold for the amounts of the liquid to be ejected is to be made is specified in print settings, the position determiner 12*a* determines "Yes" in step S174 and causes the process to proceed to step S176. When the information indicating that the determination using the threshold for the amounts of the liquid to be ejected is to be made is not specified in the print settings, the position determiner 12*a* determines "No" in step S174 and causes the process to proceed to step S178. However, the determination in step S174 may not be made. That is, the process may directly proceed to step S176 from step S172.

In step S176, the position determiner 12*a* determines whether a divided region in which the amount of the liquid to be ejected that has been calculated in step S172 is equal to or smaller than a predetermined threshold is present among the divided regions from which the blank regions in which the information code can be set have been detected in step S154. In the example illustrated in FIG. 3B, the position determiner 12*a* compares the amounts of the liquid to be ejected in the divided regions 50*d*, 50*g*, and 50*i* with the threshold. When at least one or more of the amounts of the liquid to be ejected in the divided regions 50*d*, 50*g*, and 50*i* are equal to or smaller than the threshold, the position determiner 12*a* determines "Yes" in step S176 and causes the process to proceed to step S178. On the other hand, when all the amounts of the liquid to be ejected in the divided regions 50*d*, 50*g*, and 50*i* exceed the threshold, the position determiner 12*a* determines "No" in step S176 and causes the process to proceed to step S210. According to the determination using the threshold for the amounts of the liquid to be ejected in step S176, even in a case where a divided region including a blank region in which the information code can be set is present, when all the amounts of the liquid to be ejected in the divided regions exceed the threshold, the flowchart of the information code printing process ends after the error handling process.

In step S178, the position determiner 12*a* randomly determines the information code position in a divided region in which the amount of the liquid to be ejected is the smallest among the divided regions from which the blank regions in which the information code can be set have been detected. The divided region in which the amount of the liquid to be ejected is the smallest may be a region that is least likely to curl. Thereafter, the process proceeds to step S180. In the example illustrated in FIG. 3B, since the divided region that is least likely to curl among the divided regions 50*d*, 50*g*, and 50*i* is the divided region 50*g*, the position determiner 12*a* may determine, as the information code position, any position that is in the specific blank region 52 included in the divided region 50*g* and at which the code size CS does not extend beyond the specific blank region 52.

In the second embodiment, step S178 to be performed after the position determiner 12*a* determines "Yes" in step S176 may be replaced with step S178', and step S178' may be performed. In step S178', the position determiner 12*a* randomly determines the information code position in a divided region in which the amount of the liquid to be ejected is equal to or smaller than the threshold among the divided regions from which the blank regions in which the information code can be set have been detected. Referring to FIG. 3B, for example, it is assumed that the amounts of the liquid to be ejected in the divided regions 50*g* and 50*i* are equal to or smaller than the threshold. In this case, the position determiner 12*a* determines, as the information code position, any position that is in the specific blank region 52 of the divided region 50*g* or in the specific blank region 52 of the divided region 50*i* and at which the code size CS does not extend beyond the corresponding specific blank region 52.

In the second embodiment, information indicating the information code position determined in step S178 or step S178' is positional information at the time of printing.

4. Third Embodiment

The third embodiment will be described on the premise of the second embodiment. The ease of curling in the divided regions differs due to not only amounts of liquid ejected but also differences between the positions of the divided regions in the printable region. Specifically, a divided region including a corner of the printable region, that is, a divided region including a corner of a print medium or in the vicinity of the corner easily curls, compared with the other divided regions. Therefore, the position determiner 12*a* may select, based on a difference between the positions of the divided regions in the printable region, a divided region in which the information code position is determined to be set.

The divided region including the corner of the printable region is referred to as a "first region". A divided region not including a corner of the printable region is referred to as a "second region". In the example illustrated in FIG. 3B, each of the divided regions 50*a*, 50*c*, 50*g*, and 50*i* corresponds to the first region, and each of the divided regions 50*b*, 50*d*, 50*e*, 50*f*, and 50*h* corresponds to the second region. In step S178 or step S178', when amounts of the liquid to be ejected in the first region and the second region are equal to or smaller than the threshold, the position determiner 12*a* may randomly determine the information code position in the second region.

In the following case, the shape of the target image 51 illustrated in FIG. 3B is ignored. It is assumed that each of the divided regions 50*g*, 50*h*, and 50*i* among the plurality of divided regions includes a blank region in which the information code can be set, and that the amounts of the liquid to be ejected in the divided regions 50g, 50h, and 50i are equal to or smaller than the threshold and are the same. In this case, in step S178, the position determiner 12a randomly determines the information code position in the blank region in which the information code can be set and that is included in the divided region 50h, which is the second region.

In addition, it is assumed that each of the divided regions 50g, 50h, and 50i among the plurality of divided regions includes a blank region in which the information code can be set and that the amounts of the liquid to be ejected in the divided regions 50g, 50h, and 50i are equal to or smaller than the threshold. In this case, in step S178', the position determiner 12a randomly determines the information code position in the blank region in which the information code can be set and that is included in the divided region 50h that is the second region.

A divided region including a side of the printable region, that is, a divided region including a side of the print medium or in the vicinity of the side of the print medium easily curls, compared with a divided region not including corners and sides of the printable region. The second region may include a "third region" including a side of the printable region and a "fourth region" not including a side of the printable region. In the example illustrated in FIG. 3B, each of the divided regions 50b, 50d, 50f, and 50h among the divided regions 50b, 50d, 50e, 50f, and 50h corresponds to the third region, and the divided region 50e corresponds to the fourth region. In step S178 or step S178', when the amounts of the liquid to be ejected in the third regions and the fourth region are equal to or smaller than the threshold, the position determiner 12a may randomly determine the information code position in the fourth region.

In the following case, the shape of the target image 51 illustrated in FIG. 3B is ignored. It is assumed that each of the divided regions 50e, 50f, and 50i among the plurality of divided regions includes a blank region in which the information code can be set and that the amounts of the liquid to be ejected in the divided regions 50e, 50f, and 50i are equal to or smaller than the threshold and are the same. In this case, in step S178, the position determiner 12a randomly determines the information code position in the blank region in which the information code can be set and that is included in the divided region 50e, which is the fourth region.

In addition, it is assumed that each of the divided regions 50e, 50f, and 50i among the plurality of divided regions includes a blank region in which the information code can be set and that the amounts of the liquid to be ejected in the divided regions 50e, 50f, and 50i are equal to or smaller than the threshold. In this case, in step S178', the position determiner 12a randomly determines the information code position in the blank region in which the information code can be set and that is included in the divided region 50e, which is the fourth region.

5. Fourth Embodiment

The fourth embodiment will be described on the premise of the second embodiment. The fourth embodiment and the third embodiment may be combined.

The threshold to be compared with the amounts of liquid to be ejected in the divided regions in step S176 is a value set in advance. The threshold may be a single fixed value or may be a value that varies depending on a condition. The condition is at least one of the divided regions, a printing method, an environment, the size of the print medium, the type of the print medium, and the like.

As described above, the first region more easily curls than the third region and the fourth region, and the third region more easily curls than the fourth region. Therefore, a threshold to be compared with the amount of the liquid to be ejected in the first region is set lower than a threshold to be compared with the amount of the liquid to be ejected in the third region, and the threshold to be compared with the amount of the liquid to be ejected in the third region is set lower than a threshold to be compared with the amount of the liquid to be ejected in the fourth region.

The printing method is single-sided printing or two-sided printing. The amount of ink ejected on both surfaces in a single divided region in the two-sided printing may be larger than the amount of ink ejected on one surface in the single divided region in the single-sided printing. Therefore, a threshold to be used in a case where the two-sided printing is performed on the print medium may be set lower than a threshold to be used in a case where the single-sided printing is performed on the print medium.

In addition, the environment is a temperature and a humidity in an environment in which the printing device 10 is placed. For example, the print medium with ink ejected thereon easily curls in a low-temperature and low-humidity environment compared with a regular environment at a temperature of 25° C. and a humidity of 50%. Therefore, a threshold to be used according to the environment may be set such that the threshold is lower as the environment causes the print medium to curl more easily. In a configuration using the threshold according to the environment, the printing device 10 acquires the temperature and the humidity via a temperature sensor and a humidity sensor and determines the environment in which the printing device 10 is placed. The temperature sensor and the humidity sensor are not illustrated in the drawings. In addition, since the ease of the curling varies depending on the size and type of the print medium, the threshold that varies depending on the size and type of the print medium may be set.

FIG. 7 illustrates threshold tables 60 and 61. The threshold tables 60 and 61 define thresholds according to such various conditions described above and are stored in the storage unit 18, the server 20, or the like in advance. In step S176, the position determiner 12a reads a threshold according to a condition from the threshold tables 60 and 61 and uses the read threshold for comparison with the amounts of the liquid to be ejected in the divided regions.

The threshold table 60 defines a plurality of thresholds TH1 to TH9 for the two-sided printing. The thresholds TH1 to TH9 correspond to combinations of divided regions and environments on a one-to-one basis. For example, the thresholds TH1, TH2, and TH3 corresponding to a certain environment A and corresponding to the first region, the third region, and the fourth region, respectively, have a relationship of TH1<TH2<TH3, as can be understood from the above description. In addition, when the environment A and environments B and C have a relationship in which the print medium is least likely to curl in the environment A and is most likely to curl in the environment C, for example, the thresholds TH1, TH4, and TH7 corresponding to the first region and corresponding to the environments A, B, and C, respectively, have a relationship of TH7<TH4<TH1, as can be understood from the above description. Similarly, the threshold table 61 defines a plurality of thresholds TH10 to TH18 for the single-sided printing, and the thresholds TH10 to TH18 correspond to the combinations of the divided regions and the environments on a one-to-one basis.

For example, it is assumed that, in a case where the two-sided printing is specified in print settings and the current environment corresponds to the environment B, the amount of the liquid to be ejected in the divided region 50d is compared with a threshold in step S176. In this case, the position determiner 12a may read the threshold TH5 corresponding to the third region and the environment B from the threshold table 60 for the two-sided printing and determine whether the amount of the liquid to be ejected in the divided region 50d is equal to or smaller than the threshold TH5.

Since a threshold to be compared with an amount of liquid to be ejected in a divided region varies according to a difference between the divided regions and a difference between various conditions such as the environments and the printing methods in step S176, it is possible to appropriately select a divided region in which the information code position is determined to be set. Although it may be basically understood that the plurality of thresholds TH1 to TH18 illustrated in FIG. 7 are different from each other, two or more of the thresholds TH1 to TH18 illustrated in FIG. 7 may be the same. For example, the threshold TH4 and the threshold TH8 may be the same and the threshold TH1 and the threshold TH9 may be the same.

6. Fifth Embodiment

Although the information code also serves as the positional information code in the above description, the information code may be separated from the positional information code. That is, in step S180, the modifier 12b generates a positional information code having recorded therein positional information at the time of printing, instead of regenerating the information code having recorded therein the positional information at the time of the printing. Then, in step S190, the modifier 12b sets the information code at an information code position and modifies print data by setting, in a blank region of the printable region, the positional information code generated in step S180, for example.

Figure 4B:
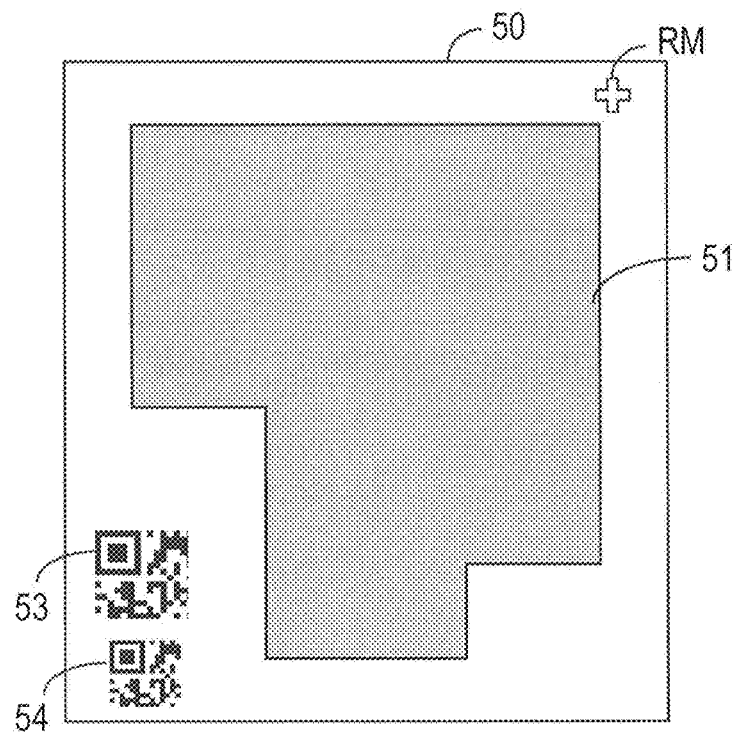
FIG. 4B is a diagram illustrating a relationship between a printable region, and a target image and an information code that are represented by print data after modification according to a fifth embodiment.

FIG. 4B illustrates a relationship between the printable region 50, and the target image 51 and the like represented by the print data after the modification in step S190 according to the fifth embodiment. In the example illustrated in FIG. 4B, the target image 51 and the reference image RM are set in the printable region 50 in a similar manner to FIG. 4A. In addition, in the example illustrated in FIG. 4B, the information code 53 not serving as the positional information code, and the positional information code 54 are set in the blank region of the printable region 50. A position where the information code 53 is set is the information code position determined in step S170 or the like. Even when the information code 53 and the positional information code 54 are printed as separate codes, the acquirer 41 can acquire the positional information at the time of the printing by decoding the positional information code 54 detected from the read image data in step S320 of the falsification determination process.

7. Sixth Embodiment

The positional information at the time of the printing may be stored in a predetermined storage unit, instead of printing, on the print medium, the positional information code having recorded therein the positional information at the time of the printing together with the target image as a part of the information code or separately from the information code.

Figure 8:
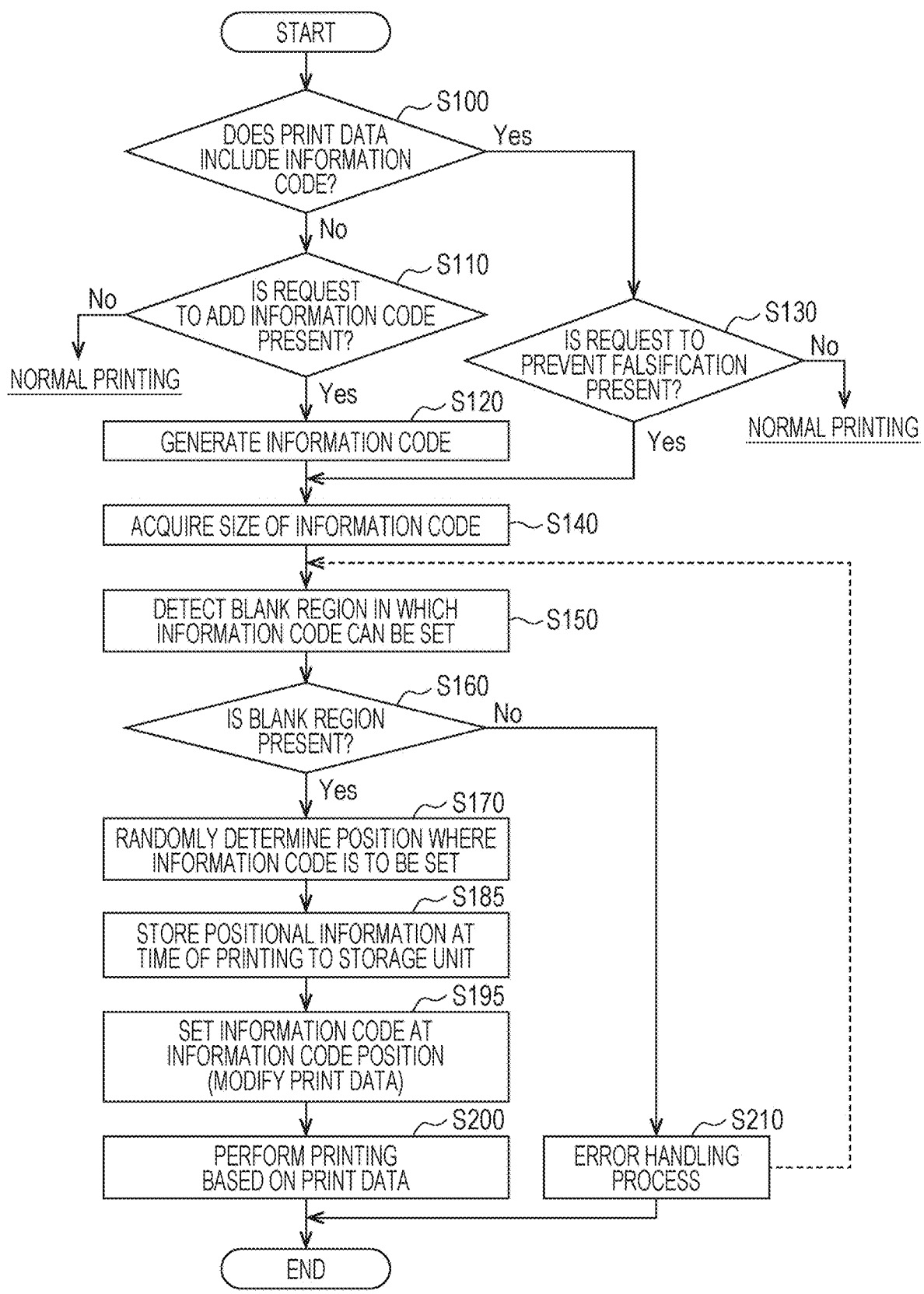
FIG. 8 is a flowchart illustrating an information code printing process according to a sixth embodiment.

FIG. 8 is a flowchart illustrating an information code printing process according to the sixth embodiment. It may be understood that the flowchart of FIG. 8 is obtained by replacing steps S180 and S190 illustrated in FIG. 2 with steps S185 and S195.

In step S185, the controller 11 causes the positional information at the time of the printing to be stored in a "storage unit". In this case, for example, the storage unit is the storage unit 18 included in the printing device 10 or is the server 20 with which the controller 11 can communicate via the communication IF 15. Step S185 corresponds to a "storing step" of storing positional information at the time of printing that indicates the position determined by the position determination step.

In step S195, the modifier 12b modifies the print data by setting the information code at the information code position determined in step S170. The information code set at the information code position in step S195 does not serve as the positional information code. Step S195 corresponds to a "modification step" of modifying print data for printing an image (target image) and the first information code so that the first information code is set at the position determined by the position determination step.

In the sixth embodiment, in step S320 of the falsification determination process, the acquirer 41 accesses the storage unit and acquires the positional information at the time of the printing from the storage unit. Thereafter, in step S330, the determiner 42 may compare the positional information after the printing acquired based on the read image data in step S310 with the positional information at the time of the printing acquired from the storage unit in step S320.

8. Seventh Embodiment

A modification of the error handling process in step S210 is described. When the process proceeds to step S210, the modifier 12b may modify at least one of the target image and the information code so that the position determiner 12a can determine that a blank region in which the information code can be set is present (the modification is hereinafter referred to as special modification), instead of notifying that printing cannot be performed and ending the flowchart of the information code printing process.

The special modification is a process of expanding a blank region in the printable region by deleting a part of the target image. In addition, the special modification may be a process of shifting the position of the target image in the printable region and securing a larger blank region anywhere in the printable region. Furthermore, the special modification may be a process of expanding the blank region in the printable region by reducing the target image in size. Furthermore, the special modification may be a process of reducing the size (code size CS) of the information code.

In step S210, the modifier 12b performs any one of the processes described above as the special modification or performs a combination of two or more of the processes described above as the special modification, and as a result, the position determiner 12a can determine that a blank region in which the information code can be set is present. That is, as indicated by dashed arrows in FIGS. 2 and 8, by forming a cycle in which the process returns to step S150 via the special modification in step S210, the position determiner 12a can determine "Yes" in step S160 and determine "Yes" in step S176.

The controller 11 may use a notification to the user and input from the user for the special modification. For example, the controller 11 may provide a notification to the user via the display unit 13 or the like to propose whether to perform any of the processes described above as the special modification and may perform any of the processes described above as the special modification in accordance with a response to the proposal from the user. In addition, when the information code position is determined in step S170 via the special modification in step S210, the controller 11 may visually notify the user of the determined information code position by the display unit 13 or the like. In addition, the controller 11 may notify the user of the information code position determined in step S170 and receive, from the user, an instruction indicating whether to set the information code at the determined information code position and print the information code and the target image. When the instruction indicates that printing is rejected, the controller 11 may correct the information code position according to an operation from the user.

9. Eighth Embodiment

In the eighth embodiment, the position determiner 12a determines, based on a specific structure of the printing unit 17, a position where the information code is to be set.

Figure 9:
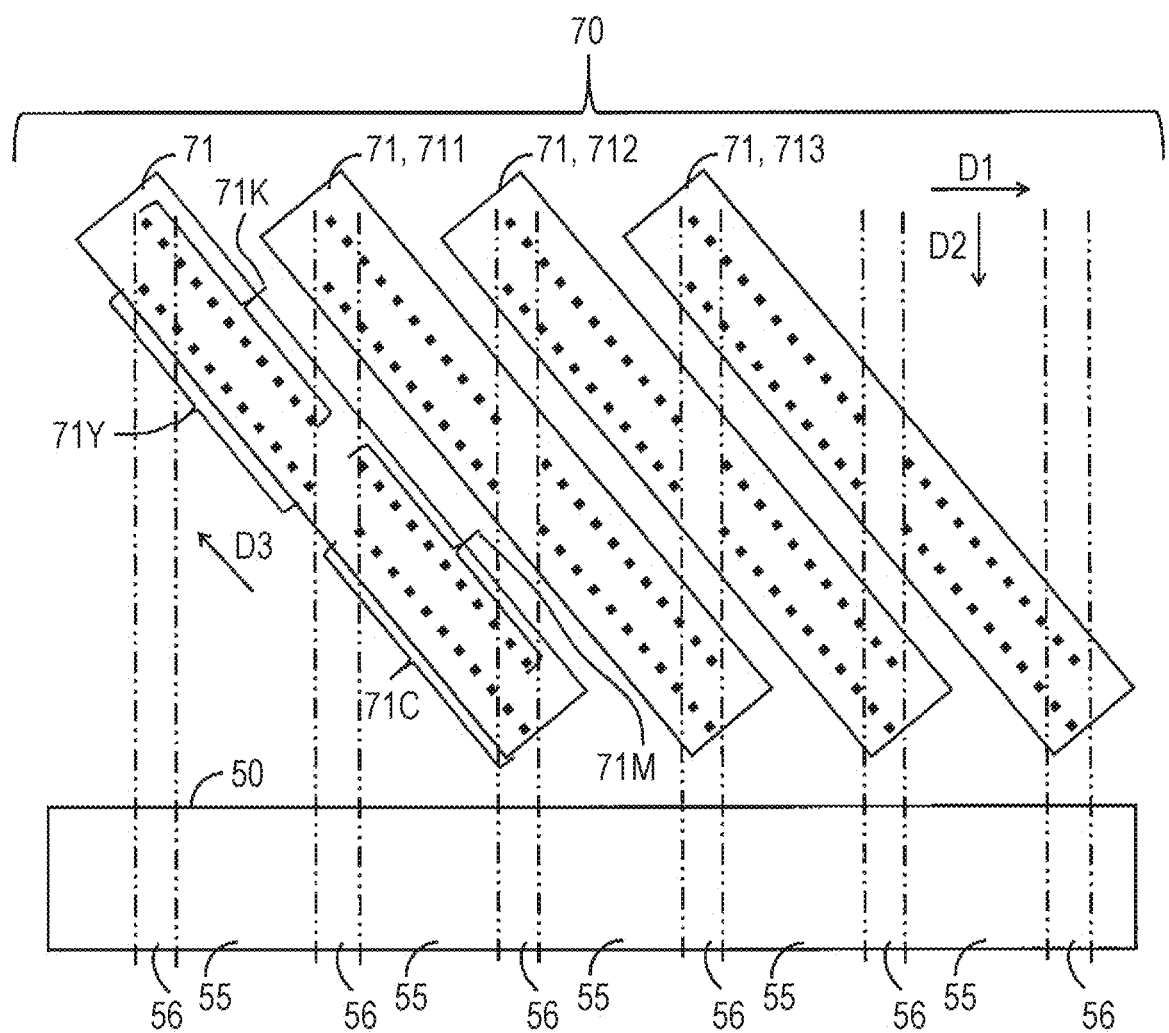
FIG. 9 is a diagram simply illustrating a structure of a line head.

FIG. 9 simply illustrates the structure of a line head according to the eighth embodiment. In the eighth embodiment, it is assumed that the printing unit 17 is the line head 70 that performs printing by ejecting liquid and that a direction orthogonal to a transport direction in which a print medium is transported is a longitudinal direction. Reference sign D1 indicates the longitudinal direction D1 of the line head 70 and reference sign D2 indicates the transport direction D2 of the print medium transported by the transport unit 16. Even when it is stated that directions are orthogonal to each other, the directions may not be exactly orthogonal to each other and may intersect each other with an error acceptable for the product.

The line head 70 includes a plurality of nozzle arrays. Each of the nozzle arrays includes a plurality of nozzles that eject ink and are arranged in a nozzle array direction D3 diagonally intersecting the longitudinal direction D1. In FIG. 9, each of multiple black points represents one nozzle, and each of the nozzle arrays is formed by arraying a plurality of nozzles in the nozzle array direction D3. Reference sign 71 represents a nozzle chip 71. Four nozzle arrays 71K, 71Y, 71M, and 71C are formed in each of nozzle chips 71. The nozzle array 71K includes a plurality of nozzles that eject K ink. The nozzle array 71Y includes a plurality of nozzles that eject Y ink. The nozzle array 71M includes a plurality of nozzles that eject M ink. The nozzle array 71C includes a plurality of nozzles that eject C ink.

In the example illustrated in FIG. 9, in each of the nozzle chips 71, the nozzle arrays 71K and 71Y are formed upstream in the transport direction D2, and the nozzle arrays 71M and 71C are formed downstream in the transport direction D2. In addition, in each of the nozzle chips 71, the nozzle arrays 71K and 71Y are formed such that the ranges of the nozzle arrays 71K and 71Y in the longitudinal direction D1 almost match, and the nozzle arrays 71M and 71C are formed such that the ranges of the nozzle arrays 71M and 71C in the longitudinal direction D1 almost match. Furthermore, in each of the nozzle chips 71, a fixed gap is present between the ranges of the nozzle arrays 71K and 71Y and the ranges of the nozzle arrays 71M and 71C in the longitudinal direction D1. Although reference sign is omitted, it may be understood that all the nozzle chips 71 illustrated in FIG. 9 have the same structure. The line head 70 is formed by arranging the plurality of nozzle chips 71 in the longitudinal direction D1. Although four nozzle chips 71 are illustrated in FIG. 9, more nozzle chips 71 are arranged in the longitudinal direction D1.

In the example illustrated in FIG. 9, three nozzle chips 71 arranged in the longitudinal direction D1 partially overlap each other in the longitudinal direction D1. Three nozzle chips 71 arranged in the longitudinal direction D1 and forming a certain single group are indicated by reference signs 711, 712, and 713 in the order of the arrangement for convenience of explanation. That is, in the longitudinal direction D1, the nozzle chip 711 partially overlaps the nozzle chip 712 and partially overlaps the nozzle chip 713. Each of the nozzle arrays included in the nozzle chip 711 corresponds to a "first nozzle array". Each of the nozzle arrays included in the nozzle chip 712 corresponds to a "second nozzle array". Each of the nozzle arrays included in the nozzle chip 713 corresponds to a "third nozzle array". The nozzle chip 711 may be simply treated as the first nozzle array. The nozzle chip 712 may be simply treated as the second nozzle array. The nozzle chip 713 may be simply treated as the third nozzle array.

The line head 70 described above ejects ink dots in order of K, Y, M, and C ink to each position in the longitudinal direction D1 on the print medium transported below the line head 70 from upstream to downstream in the transport direction D2. In addition, according to the configuration of the line head 70, a region (normal region) to which adjacent two nozzle chips 71 eject ink in order of K, Y, M, and C ink, and a region (nozzle array gap region) to which two nozzle chips 71 between which one nozzle chip 71 is present eject ink in order of K, Y, M, and C ink are present on the print medium.

FIG. 9 illustrates a part of the printable region 50 of the print medium. A normal region 55 and a nozzle array gap region 56 are alternately arranged in the longitudinal direction D1 in the printable region 50 based on a predetermined positional relationship between the print medium and the line head 70 in the longitudinal direction D1. That is, for example, each of a region to be printed using the nozzle arrays 71K and 71Y of the nozzle chip 712 and the nozzle arrays 71M and 71C of the nozzle chip 711 and a region to be printed using the nozzle arrays 71K and 71Y of the nozzle chip 713 and the nozzle arrays 71M and 71C of the nozzle chip 712 corresponds to the normal region 55. For example, a region to be printed using the nozzle arrays 71K and 71Y of the nozzle chip 713 and the nozzle arrays 71M and 71C of the nozzle chip 711 corresponds to the nozzle array gap region 56.

Since the distance in the transport direction D2 between the two nozzle chips 71 to be used to perform printing on the normal region 55 is different from the distance in the transport direction D2 between the two nozzle chips 71 to be used to perform printing on the nozzle array gap region 56, a difference between the time of landing of K and Y ink dots on the normal region 55 and the time of landing of M and C ink dots on the normal region 55 is different from a difference between the time of landing of K and Y ink dots on the nozzle array gap region 56 and the time of landing of M and C ink dots on the nozzle array gap region 56. That is, a time interval from landing of a K ink dot and a Y ink dot on the nozzle array gap region 56 to landing of an M ink dot and a C ink dot on the nozzle array gap region 56 is longer than a time interval from landing of a K ink dot and a Y ink dot on the normal region 55 to landing of an M ink dot and a C ink dot on the normal region 55. The difference between the time intervals of the landing may affect degrees of infiltration of the dots of the colors landed on the print medium into the print medium and degrees of mixture of the dots of the colors and, as a result, may easily cause a difference between a color in the normal region 55 and a color in the nozzle array gap region 56. That is, in the printing result, the nozzle array gap region 56 may look streaky and uneven in color.

When at least a part of the information code is printed in the nozzle array gap region 56, the information code may be included in the normal region 55 and the nozzle array gap region 56, and the quality of the information code in the printing result may decrease. To avoid this, the position determiner 12a randomly determines the information code position in the normal region 55 while avoiding the nozzle array gap region 56 in step S170, step S178, and step S178' described above.

10. Ninth Embodiment

Figure 10:
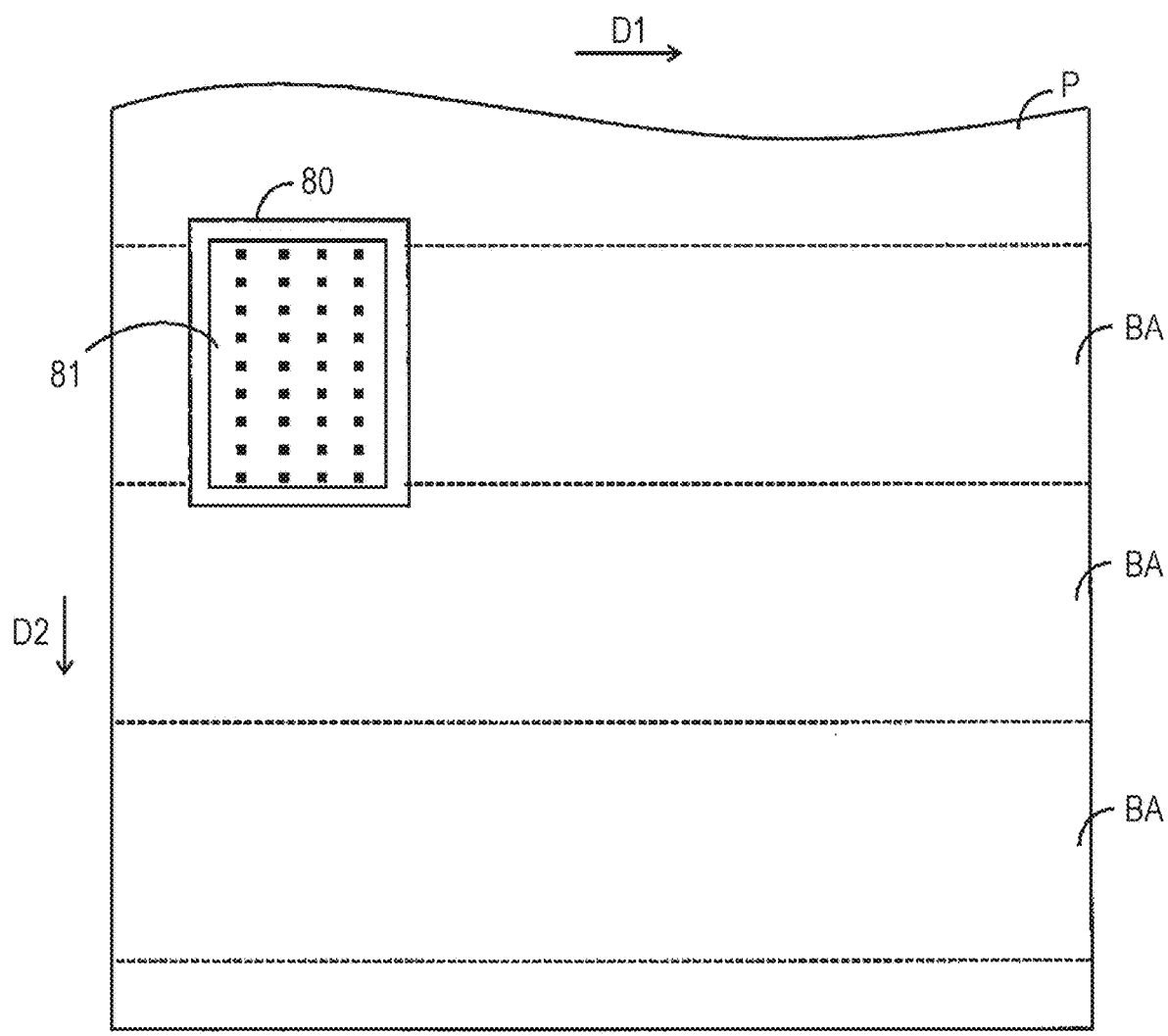
FIG. 10 is a diagram simply illustrating a structure of a serial head.

FIG. 10 simply illustrates a structure of a serial head according to the ninth embodiment. In the ninth embodiment, it is assumed that the direction orthogonal to the transport direction D2 of the print medium is a movement direction D1 and that the printing unit 17 is the serial head 81 that performs printing by ejecting liquid from a plurality of nozzles while being moved in the movement direction D1. In FIG. 10, the serial head 81 includes nozzle arrays corresponding to C ink, M ink, Y ink, and K ink. The serial head 81 is mounted on a carriage 80 that can reciprocate in the movement direction D1. The serial head 81 is moved by the carriage 80.

FIG. 10 also illustrates a print medium P transported by the transport unit 16 from upstream to downstream in the transport direction D2. In the ninth embodiment, it is assumed that band printing is performed in which the transport of the print medium P by the transport unit 16 over a certain distance and a pass that is printing by the serial head 81 in one movement of the serial head 81 are alternately performed. The certain distance corresponds to a length of the serial head 81 in the transport direction D2. A belt-shaped region BA separated by chain lines on the print medium P is a one-pass region BA that is included in a printable region and in which printing is performed by the serial head 81 in one movement of the serial head 81. The chain lines that separate the one-pass region BA are not actually present. It is simply understood that the print medium P is the printable region in FIG. 10.

When the information code is printed in adjacent two one-pass regions BA, the quality of the information code in a printing result may decrease due to misalignment of the printing or a portion that is streaky and uneven in color at a boundary between one-pass regions BA. To avoid this, the position determiner 12a may randomly determine the information code position in a single one-pass region BA in step S170, step S178, and step S178' described above.

11. Tenth Embodiment

Regarding a highly confidential printed matter, after read image data is generated, it may be requested to discard the printed matter and discard information on printing. In the tenth embodiment, it is assumed that such a highly confidential printed matter is handled.

FIG. 11 is a flowchart illustrating a log information management process according to the tenth embodiment. The log information management process is performed by the server 20. The server 20 that performs the log information management process corresponds to a "log managing unit" that stores and manages log information.

In step S400, the server 20 acquires "log information" on printing performed by the printing unit 17 on a print medium and stores the log information in a storage section included in the server 20. That is, the controller 11 of the printing device 10 causes the printing unit 17 to perform the printing based on print data to generate the log information on the printing and transmit the generated log information to the server 20. The log information on the printing may include various types of information such as a file name of the print data, a date and time when the log information was generated, a date and time when the printing was performed, information on confidentiality, identification information of a user who performed the printing, a print setting used for the printing, and the print data itself, for example. The server 20 acquires and stores the transmitted log information. Step S400 and steps S430 and S440 described later correspond to a "log management step".

The user sets the print medium as a printing result of the printing by the printing unit 17 at the reading device 30, causes the transporter 31 to start transporting the print medium, and causes the reader 32 to start reading the print medium. By performing this, the falsification determination process described with reference to FIG. 5 is performed.

The transporter 31 of the reading device 30 subsequently transports the print medium read by the reader 32 to the shredder 33. The shredder 33 discards the print medium transported by the transporter 31. In this manner, a "transport step" of transporting a print medium and a "discarding step" of discarding the print medium transported by the transport step are performed.

The determiner 42 of the determining device 40 transmits the determination result of the falsification determination performed in step S340 to the server 20, and the server 20 acquires the determination result (step S410).

In step S420, the server 20 branches the process based on whether the determination result acquired in step S410 indicates a falsified matter. When the determination result acquired in step S410 indicates the falsified matter, the server 20 determines "Yes" in step S420 and causes the process to proceed to step S430. When the determination result acquired in step S410 does not indicate the falsified matter, the server 20 determines "No" in step S420 and causes the process to proceed to step S440.

In step S430, the server 20 maintains the log information stored in step S400 without changing the log information and ends the log information management process. That is, the log information corresponding to the printing result determined to be the falsified matter is not discarded. On the other hand, in step S440, the server 20 discards the log information stored in step S400 and ends the log information management process. That is, the log information corresponding to the valid printing result determined not to be the falsified matter is deleted together with the discarding of the printing result by the shredder 33.

12. Conclusion

According to the present embodiment, the printing system 1 includes the printing unit 17 that performs printing on a print medium based on print data, the position determiner 12a that randomly determines a position where a first information code is to be set in a printable region in which the print medium is printable by the printing unit 17, the modifier 12b that modifies the print data for printing an image, the first information code, and a positional information code having recorded therein positional information at the time of the printing that indicates the position determined by the position determiner 12a so that the first information code is set at the position determined by the position determiner 12a, the acquirer 41 that acquires the position of the first information code on the print medium as positional information after the printing via reading of a printing result of the printing performed by the printing unit 17 on the print medium based on the print data, and acquires the positional information at the time of the printing from the positional information code, and the determiner 42 that determines whether the printing result is a falsified matter based on comparison of the positional information after the printing acquired by the acquirer 41 with the positional information at the time of the printing acquired by the acquirer 41.

According to the configuration, the print data is modified so that the information code is set at the position randomly determined, and whether the printing result is the falsified matter is determined based on the comparison of the positional information after the printing acquired from the printing result based on the print data with the positional information at the time of the printing. That is, the position of the information code is used for the falsification determination about the printed matter. Therefore, it is possible to easily determine whether the printing result is the falsified matter without using special ink and a device that reads the special ink, unlike existing techniques. In addition, since the position of the first information code is randomly determined, it is difficult to falsify the first information code by cutting the first information code from the printing result and attaching the cut first information code to another medium. Therefore, it is possible to improve the security of the printing result. The falsification determination may be rephrased as authenticity determination.

When the expression "modifying the print data for printing the image, the first information code, and the positional information code" is used, the print data before the modification may not include the first information code and the positional information code.

In addition, according to the present embodiment, the modifier 12b may generate a part of the first information code as the positional information code.

When the positional information code serves as the first information code, only the one code is to be printed, which leads to reduced ink consumption. However, as described in the fifth embodiment, the first information code and the positional information code may be separate codes.

In addition, according to the present embodiment, the printing unit 17 may be a mechanism that performs printing by ejecting liquid. The position determiner 12a may calculate amounts of the liquid to be ejected to print the image in a plurality of regions obtained by dividing the printable region and randomly determine a position where the first information code is to be set in a region in which the amount of the liquid to be ejected is equal to or smaller than a predetermined threshold among the plurality of regions.

According to the configuration, by setting the first information code in the divided region in which the amount of the liquid to be ejected is relatively small, it is possible to print the first information code at a position where the print medium curls as little as possible, and improve the accuracy of reading the first information code.

In addition, according to the present embodiment, the position determiner 12a may randomly determine a position where the first information code is to be set in a region in which the amount of the liquid to be ejected is the smallest among the plurality of regions.

According to the configuration, by setting the first information code in the divided region in which the amount of the liquid to be ejected is the smallest, it is possible to avoid an effect of the curling of the print medium and improve the accuracy of reading the first information code.

In addition, according to the present embodiment, the plurality of divided regions may include a first region including a corner of the printable region and a second region not including a corner of the printable region, and the position determiner 12a may randomly determine a position where the first information code is to be set in the second region when amounts of the liquid to be ejected in the first region and the second region are equal to or smaller than the threshold.

Furthermore, the second region may include a third region including a side of the printable region and a fourth region not including a side of the printable region, and the position determiner 12a may randomly determine a position where the first information code is to be set in the fourth region when amounts of the liquid to be ejected in the third region and the fourth region are equal to or smaller than the threshold.

According to these configurations, by selecting a divided region in which the print medium is unlikely to curl and setting the first information code in the selected divided region, it is possible to avoid an effect of the curing of the print medium and improve the accuracy of reading the first information code.

In addition, according to the present embodiment, the positional information at the time of the printing may indicate a distance from a side of the print medium to the first information code, and the acquirer 41 may analyze read image data generated by reading the printing result to acquire, as the positional information after the printing, the distance from the side of the print medium to the first information code.

According to the configuration, it is possible to easily generate the positional information at the time of the printing and easily acquire the positional information after the printing from the read image data.

Alternatively, the positional information at the time of the printing may indicate a distance from a reference image RM to be printed in the printable region to the first information code, and the modifier 12b modifies the print data for printing the image, the first information code, and the positional information code so that the reference image RM is set in the printable region. Then, the acquirer 41 may analyze read image data generated by reading the printing result to acquire, as the positional information after the printing, the distance from the reference image RM to the first information code.

According to the configuration, it is possible to easily generate the positional information at the time of the printing. In addition, since the reference image RM and the first information code are printed on the print medium, even when the position of the printing result deviates with respect to the print medium, a positional relationship between the reference image RM and the first information code in the printing result does not change and it is possible to accurately acquire the positional information after the printing.

In addition, according to the present embodiment, when the same image is to be printed on a plurality of print media by the printing unit 17, the position determiner 12a may determine positions of the first information code that correspond to the plurality of print media such that the position of the first information code on at least one of the print media is different from the position of the first information code on the other print medium or media.

According to the configuration, by printing the first information code at different positions on the plurality of print media as much as possible, it can make it difficult to falsify the printed matter and it is possible to improve the accuracy of the falsification determination.

In addition, according to the present embodiment, the position determiner 12a may determine whether a blank region that is not in the image and in which the first information code can be set is present in the printable region. When the position determiner 12a determines that the blank region is present, the position determiner 12a may randomly determine a position where the first information code is to be set in the blank region.

According to the configuration, since the first information code is set and printed in the blank region, it is possible to maintain the quality of the image without reducing the accuracy of reading the first information code.

In addition, according to the present embodiment, when the position determiner 12a determines that the blank region is not present, the modifier 12b may modify at least one of the image and the first information code so that the position determiner 12a determines that the blank region is present, and the position determiner 12a may randomly determine a position where the first information code is to be set in the blank region.

According to the configuration, even when the blank region is originally narrow and a space in which the first information code can be set is not present before the modification, it is possible to set the first information code anywhere in the blank region.

In the present embodiment, when a position where the first information code is to be set is to be randomly determined, a position that is not in the blank region may be determined. For example, in the printable region, a part of the image (target image) represented by the print data may overlap a part of the first information code. In addition, for example, the first information code may overlap the image and may be set in a region that is included in the image and in which a color density is equal to or lower than a predetermined density.

In addition, according to the embodiment, the direction orthogonal to the transport direction D2 of the print medium may be the longitudinal direction D1, and the printing unit 17 may be the line head 70 that performs printing by ejecting liquid. In this case, the line head 70 includes a plurality of nozzle arrays, and each of the nozzle arrays includes a plurality of nozzles that eject liquid and are arranged in the nozzle array direction D3 diagonally intersecting the longitudinal direction D1. Three nozzle arrays that are arranged in the longitudinal direction D1 and partially overlap each other in the longitudinal direction D1 are a first nozzle array, a second nozzle array, and a third nozzle array arranged in this order. When a region that is in the printable region and to be printed using the first nozzle array and the second nozzle array and a region that in the printable region and to be printed using the second nozzle array and the third nozzle array are a normal region 55, and a region that is in the printable region and to be printed using the first nozzle array and the third nozzle array is a nozzle array gap region 56, the position determiner 12a may randomly determine a position where the first information code is to be set in the normal region 55.

According to the configuration, it is possible to prevent all or a part of the first information code from being printed in the nozzle array gap region 56 and prevent the accuracy of reading the first information code from decreasing due to the degradation of the image quality of the first information code.

In addition, according to the present embodiment, the direction orthogonal to the transport direction D2 of the print medium may be the movement direction D1, and the printing unit 17 may be the serial head 81 that performs printing by ejecting liquid from the plurality of nozzles while being moved in the movement direction D1. In this case, when a region that is included in the printable region and to be printed by the serial head 81 in one movement of the serial head 81 is a one-pass region BA, the position determiner 12a may randomly determine a position where the first information code is to be set in the single one-pass region BA.

According to the configuration, it is possible to prevent the first information code from being printed in two one-pass regions BA and prevent the accuracy of reading the first information code from decreasing due to the degradation of the image quality of the first information code.

In addition, according to the present embodiment, the printing system 1 may further include the log managing unit that stores and manages log information on the printing performed by the printing unit 17 on the print medium, the transporter 31 that transports the print medium after the reading, and the discarding unit that discards the print medium transported by the transporter 31. When the determiner 42 determines that the printing result is not the falsified matter, the log managing unit may discard the log information corresponding to the printing result determined not to be the falsified matter. When the determiner 42 determines that the printing result is the falsified matter, the log managing unit may maintain the storage of the log information corresponding to the printing result determined to be the falsified matter.

According to the configuration, from the perspective of ensuring the security of a confidential document or the like, the printing result from which the read image data is obtained can be discarded by the shredder 33 and it is possible to avoid discarding the log information on the falsified printing result in the process of discarding the log information. By keeping the log information on the falsified printing result, it is possible to reference the log information later and perform necessary verification.

In addition, according to the embodiment, the printing system 1 may include the printing unit 17 that performs printing on a print medium based on print data, the position determiner 12a that randomly determine a position where a first information code is to be set in a printable region in which the print medium is printable by the printing unit 17, the storage unit that stores positional information at the time of the printing that indicates the position determined by the position determiner 12a, the modifier 12b that modifies the print data for printing an image and the first information code so that the first information code is set at the position determined by the position determiner 12a, the acquirer 41 that acquires the position of the first information code on the print medium as positional information after the printing via reading of a printing result of the printing performed by the printing unit 17 on the print medium based on the print data, and the determiner 42 that determines whether the printing result is a falsified matter based on comparison of the positional information after the printing acquired by the acquirer 41 with the positional information at the time of the printing acquired from the storage unit.

According to the configuration, the print data is modified so that the first information code is set at the position randomly determined, and whether the printing result is the falsified matter is determined based on the comparison of the positional information after the printing acquired from the printing result based on the print data with the positional information at the time of the printing stored in the storage unit. That is, the position of the first information code is used for the falsification determination about the printed matter. Therefore, it is possible to easily determine whether the printing result is the falsified matter without using special ink and a device that reads the special ink, unlike existing techniques.

When the expression "modifying the print data for printing the image, the first information code, and the positional information code" is used, the print data before the modification may not include the first information code.

The present embodiment discloses techniques in various categories including, but not limited to the devices and the system, the method to be performed by the devices, the method to be performed by the system, and the program 12 for causing the processor to perform the method.

That is, a printing determination method includes a position determination step of randomly determining a position where a first information code is to be set in a printable region in which a print medium is printable by the printing unit 17, a modification step of modifying print data for printing an image, the first information code, and a positional information code having recorded therein positional information at the time of printing that indicates the position determined by the position determination step so that the first information code is set at the position determined by the position determination step, a printing step of performing the printing by the printing unit 17 on the print medium based on the print data, an acquisition step of acquiring the position of the first information code on the print medium as positional information after the printing via reading of a printing result of the printing by the printing step, and acquiring the positional information at the time of the printing from the positional information code, and a determination step of determining whether the printing result is a falsified matter based on comparison of the positional information after the printing acquired by the acquisition step with the positional information at the time of the printing acquired by the acquisition step.

In addition, a printing determination method includes a position determination step of randomly determining a position where a first information code is to be set in a printable region in which a print medium is printable by the printing unit 17, a storing step of storing, in a storage unit, positional information at the time of printing that indicates the position determined by the position determination step, a modification step of modifying print data for printing an image and the first information code so that the first information code is set at the position determined by the position determination step, a printing step of performing the printing by the printing unit 17 on the print medium based on the print data, an acquisition step of acquiring the position of the first information code on the print medium as positional information after the printing via reading of a printing result of the printing by the printing step, and a determination step of determining whether the printing result is a falsified matter based on comparison of the positional information after the printing acquired by the acquisition step with the positional information at the time of the printing acquired from the storage unit.

Needless to say, it is possible to understand the methods according to the various aspects described in the present embodiment. In addition, it is possible to change the order in which the steps constituting the methods are performed.

Modifications included in the present embodiment are described below.

When two-sided printing is to be performed on both surfaces of a print medium, and attention is paid to a single divided region of the print medium, the larger the difference between the amount of liquid to be ejected onto one of the surfaces of the print medium and the amount of liquid to be ejected onto the other surface of the print medium, the easier it may be for the print medium to curl. Therefore, the position determiner 12a may preferentially select a divided region in which the position of the first information code is to be randomly determined to be set and in which the difference between the amount of liquid to be ejected onto one of the surfaces of the print medium and the amount of liquid to be ejected onto the other surface of the print medium is the smallest.

When the size of the first information code is changed by the special modification, the controller 11 records and stores, as information, the size of the first information code after the change, the amount of change in the size, and the like in the positional information code and the storage unit. Then, the determiner 42 may compare the information of the size of the first information code after the change or the like with the size of the first information code acquired from the read image data in addition to the comparison of the positional information after the printing with the positional information at the time of the printing to improve the accuracy of the falsification determination.

What is claimed is:

1. A printing system comprising:
   a printing unit that performs printing on a print medium based on print data;
   a position determiner that randomly determines a position where a first information code is to be set in a printable region in which the print medium is printable by the printing unit;
   a modifier that modifies the print data for printing an image, the first information code, and a positional information code having recorded therein positional information at the time of the printing that indicates the position determined by the position determiner so that the first information code is set at the position determined by the position determiner;
   an acquirer that acquires the position of the first information code on the print medium as positional information after the printing via reading of a printing result of the printing performed by the printing unit on the print medium based on the print data and acquires the positional information at the time of the printing from the positional information code; and
   a determiner that determines whether the printing result is a falsified matter based on comparison of the positional information after the printing acquired by the acquirer with the positional information at the time of the printing acquired by the acquirer.

2. The printing system according to claim 1, wherein the modifier generates a part of the first information code as the positional information code.

3. The printing system according to claim 1, wherein
   the printing unit is a mechanism that performs the printing by ejecting liquid, and
   the position determiner calculates amounts of the liquid to be ejected to print the image in a plurality of regions obtained by dividing the printable region and randomly determines a position where the first information code is to be set in a region in which the amount of the liquid to be ejected is equal to or smaller than a predetermined threshold among the plurality of regions.

4. The printing system according to claim 3, wherein the position determiner randomly determines a position where the first information code is to be set in a region in which the amount of the liquid to be ejected is the smallest among the plurality of regions.

5. The printing system according to claim 3, wherein the plurality of regions include a first region including a corner of the printable region and a second region not including a corner of the printable region, and
when the amount of the liquid to be ejected in the first region and the amount of the liquid to be ejected in the second region are equal to or smaller than the threshold, the position determiner randomly determines a position where the first information code is to be set in the second region.

6. The printing system according to claim 5, wherein
the second region includes a third region including a side of the printable region and a fourth region not including a side of the printable region, and
when the amount of the liquid to be ejected in the third region and the amount of the liquid to be ejected in the fourth region are smaller than the threshold, the position determiner randomly determines a position where the first information code is to be set in the fourth region.

7. The printing system according to claim 1, wherein
the positional information at the time of the printing indicates a distance from a side of the print medium to the first information code, and
the acquirer analyzes read image data generated by reading the printing result to acquire, as the positional information after the printing, the distance from the side of the print medium to the first information code.

8. The printing system according to claim 1, wherein
the positional information at the time of the printing indicates a distance from a reference image to be printed in the printable region to the first information code,
the modifier modifies the print data for printing the image, the first information code, and the positional information code so that the reference image is set in the printable region, and
the acquirer analyzes read image data generated by reading the printing result to acquire, as the positional information after the printing, the distance from the reference image to the first information code.

9. The printing system according to claim 1, wherein
when the same image is to be printed by the printing unit on a plurality of print media, the position determiner determines positions of the first information code that correspond to the plurality of print media such that the position of the first information code on at least one of the print media is different from the position of the first information code on the other print medium or media.

10. The printing system according to claim 1, wherein
the position determiner determines whether a blank region that is not in the image and in which the first information code can be set is present in the printable region, and
when the position determiner determines that the blank region is present, the position determiner randomly determines a position where the first information code is to be set in the blank region.

11. The printing system according to claim 1, further comprising:

a log managing unit that stores and manages log information on the printing performed by the printing unit on the print medium;
a transport unit that transports the print medium after the reading; and
a discarding unit that discards the print medium transported by the transport unit, wherein
when the determiner determines that the printing result is not the falsified matter, the log managing unit discards the log information corresponding to the printing result determined not to be the falsified matter, and
when the determiner determines that the printing result is the falsified matter, the log managing unit maintains the storage of the log information corresponding to the printing result determined to be the falsified matter.

12. A printing system comprising:
a printing unit that performs printing on a print medium based on print data;
a position determiner that randomly determines a position where a first information code is to be set in a printable region in which the print medium is printable by the printing unit;
a storage unit that stores positional information at the time of the printing that indicates the position determined by the position determiner;
a modifier that modifies print data for printing an image and the first information code so that the first information code is set at the position determined by the position determiner;
an acquirer that acquires the position of the first information code on the print medium as positional information after the printing via reading of a printing result of the printing performed by the printing unit on the print medium based on the print data; and
a determiner that determines whether the printing result is a falsified matter based on comparison of the positional information after the printing acquired by the acquirer with the positional information at the time of the printing acquired from the storage unit.

13. A printing determination method comprising:
a position determination step of determining a position where a first information code is to be set in a printable region in which a print medium is printable by a printing unit;
a modification step of modifying print data for printing an image, the first information code, and a positional information code having recorded therein positional information at the time of printing that indicates the position determined by the position determination step so that the first information code is set at the position determined by the position determination step;
a printing step of performing the printing by the printing unit on the print medium based on the print data;
an acquisition step of acquiring the position of the first information code on the print medium as positional information after the printing via reading of a printing result of the printing by the printing step and acquiring the positional information at the time of the printing from the positional information code; and
a determination step of determining whether the printing result is a falsified matter based on comparison of the positional information after the printing acquired by the acquisition step with the positional information at the time of the printing acquired by the acquisition step.

14. The printing determination method according to claim 13, wherein in the modification step, a part of the first information code is generated as the positional information code.

15. The printing determination method according to claim 14, wherein
the printing unit is a mechanism that performs the printing by ejecting liquid, and
in the position determination step, amounts of the liquid to be ejected to print the image in a plurality of regions obtained by dividing the printable region are calculated, and a position where the first information code is to be set in a region in which the amount of the liquid to be ejected is equal to or smaller than a predetermined threshold among the plurality of regions is randomly determined.

16. The printing determination method according to claim 15, wherein in the position determination step, a position where the first information code is to be set in a region in which the amount of the liquid to be ejected is the smallest among the plurality of regions is randomly determined.

17. The printing determination method according to claim 15, wherein
the plurality of regions include a first region including a corner of the print medium and a second region not including a corner of the print medium, and
in the position determination step, when the amount of the liquid to be ejected in the first region and the amount of the liquid to be ejected in the second region are equal to or smaller than the threshold, a position where the first information code is to be set in the second region is randomly determined.

18. The printing determination method according to claim 17, wherein
the second region includes a third region including a side of the print medium and a fourth region not including a side of the print medium, and
in the position determination step, when the amount of the liquid to be ejected in the third region and the amount of the liquid to be ejected in the fourth region are equal to or smaller than the threshold, a position where the first information code is to be set in the fourth region is randomly determined.

19. The printing determination method according to claim 13, wherein
the positional information at the time of the printing indicates a distance from a side of the print medium to the first information code, and
in the acquisition step, read image data generated by reading the printing result is analyzed to acquire, as the positional information after the printing, the distance from the side of the print medium to the first information code.

20. The printing determination method according to claim 16, wherein
the positional information at the time of the printing indicates a distance from a reference image to be printed in the printable region to the first information code, and
in the modification step, the print data for printing the image, the first information code, and the positional information code is modified so that the reference image is set in the printable region, and
in the acquisition step, read image data generated by reading the printing result is analyzed to acquire, as the positional information after the printing, the distance from the reference image to the first information code.

* * * * *